US006487169B1

(12) United States Patent
Tada

(10) Patent No.: US 6,487,169 B1
(45) Date of Patent: Nov. 26, 2002

(54) CELL SWITCH MODULE WITH UNIT CELL SWITCHING FUNCTION

(75) Inventor: Katsuyuki Tada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/327,126

(22) Filed: Jun. 7, 1999

(30) Foreign Application Priority Data

Dec. 9, 1998 (JP) .......................................... 10-349462

(51) Int. Cl.[7] .............................................. G01R 31/08
(52) U.S. Cl. ........................................ 370/219; 370/360
(58) Field of Search ................................. 370/219, 220, 370/360, 216

(56) References Cited

U.S. PATENT DOCUMENTS

| 5,406,548 A | * | 4/1995 | Itoh et al. ....................... 370/16 |
| 5,870,382 A | * | 2/1999 | Tounai et al. ................ 370/220 |
| 5,903,543 A | * | 5/1999 | Lee et al. .................... 370/216 |

FOREIGN PATENT DOCUMENTS

JP          5-7213          1/1993

* cited by examiner

*Primary Examiner*—Wellington Chin
*Assistant Examiner*—Brenda Pham
(74) *Attorney, Agent, or Firm*—Katten Muchin Zavis Rosenman

(57) ABSTRACT

A cell switch module having a unit cell switching function and placeable in either an active state or a standby state. The module comprises a plurality of input ports for inputting cells thereto, a plurality of output ports for outputting cells therefrom, and a cell switching controller to execute such control that, in response to an active/standby switching instruction, a decision is made as to whether the input cell is a specific first cell or not, and if the input cell is detected to be the first cell in the active state, any subsequent cell inputted thereafter is not switched, but if the input cell is detected to be the first cell in the standby state, any subsequent cell inputted thereafter is switched.

5 Claims, 17 Drawing Sheets

CELL SWITCH MODULE WITH UNIT CELL SWITCHING FUNCTION

BACKGROUND OF THE INVENTION

1. Field of the Invention

The present invention relates to a cell switch module, a transmitter and an active/standby switching method in such a transmitter, and more particularly to switching executed at the time of up-grading a network.

2. Description of the Related Art

In the known public transmission network, audio signals and data information are transmitted to be processed via an infrastructure of SONET (Synchronous Optical Network) in a format of STM (Synchronous Transfer Mode). Such service signals according to the STM format are accessed, in each transmitter, at an STS-1 (Synchronous Transport Signal: 51.84 MHz) level conforming with the SONET frame format or a VT (Virtual Tributary: 1.726 MHz) level. External interfaces employed therefor conform with OC-48 (optical signal: 2.4 GHz), OC-12 (optical signal: 600 MHz), OC-3 (optical signal: 150 MHz), DS3 (electric signal: 44.736 MHz), DS1 (electric signal: 1.544 MHz) and so forth. Further, recently, there is practically used of a data information service which is based on the ATM (Asynchronous Transfer Mode) signal format to realize effective utilization of transmission lines and the band of transmission equipment.

In laying an optical fiber network for use in SONET or the like, the construction thereof by the network service contractor concerned is carried out on the basis of a long-term plan since the construction costs much and the required term for construction of such fiber network is long. On the other hand, it is expected that demands for digital data services using optical fiber networks as transmission lines will increase rapidly after initial diffusion, as represented currently by the Internet. In order to comply with the circumstances thus changing so fast, it is considered necessary to develop an improved transmitter which has a high-speed optical line terminator with a great transmission capacity per optical fiber and a fast digital line terminator adapted for transmitting, via the same transmission channel, both the conventional telephone service where the demand of transmission information is predictable with relative facility and the aforementioned digital data service, and is capable of freely changing, in accordance with needs of such services, the ratio of using such services (e.g., by increaseing the band of ATM cells while correspondingly decreasing the band of data signals other than ATM cells, such as DS1 TDM or DS3 TDM).

Since some modification or extension of such service structure is carried out after practical running, it is necessary to up-grade the same in a manner to render the harmful influence least on the service network being currently used. For example, loss of ATM cells needs to be minimized at the time of any modification or extension. However, none of the known transmitters adapted for handling both STM and ATM signals is equipped with an ATM cell switching function and another function of freely changing the band of ATM cells and that of other signal, although both STM and ATM signals can be transferred via the same optical fiber.

SUMMARY OF THE INVENTION

It is therefore an object of the present invention to provide a cell switch module which is capable of switching ATM cells with any other data signal and still is capable of freely changing the band of ATM cells.

Another object of the present invention resides in providing a cell switch module capable of minimizing loss of cells in a cross-connected state of ATM lines to be updated or extended, or in up-grading control software employed therein.

It is a further object of the present invention to provide a transmitter wherein none of ATM cells is sent in duplication when active/standby switching is executed for up-grading.

And a still further object of the present invention is to provide a network adapted to perform, through manipulation under remote control, active/standby switching for up-grading.

In accordance with an aspect of the present invention, there is provided a cell switch module equipped with a unit cell switching function. The module comprises a plurality of input ports for inputting cells thereto respectively; a plurality of output ports for outputting cells therefrom respectively; and cell switching control means placeable in either an active state or a standby state, wherein a decision is made as to whether each cell inputted to the relevant input port is a specific first cell or not, and a control action is so executed that, if the result of the decision signifies that the cell is said first one in the active state, any subsequent cell inputted thereafter to the input port is not switched, and if the above result signifies that the cell is said first one in the standby state, any subsequent cell inputted thereafter is switched. Preferably, the cell switch module further comprises a queue empty detection means for detecting whether the all cells switched by the active cell switch module in response to an active/standby switching instruction have been completely outputted from the output ports.

In the structure mentioned, the cell switching operation is brought to a stop in the active cell switch module in response to a detection of the first cell as a trigger by the cell input control means, and the cell switching operation is performed in the standby cell switch module. Any subsequent cell inputted after the first cell to the relevant same line is switched in the standby module but not in the active module. Thus, due to such a double structure where both active and standby cell switch modules are prepared, the cell switching operation is not performed in duplication with regard to any of subsequent cells inputted after the first cell to the relevant same line.

In accordance with another aspect of the present invention, there is provided a transmitter which comprises a first cell switch module as the above active one and a second cell switch module as the above standby one; a plurality of selectors for selecting, in response to a select signal, signals obtained from two output ports corresponding respectively to the first and second cell switch modules; and a switching control means for generating the select signal to instruct switching from the acting module to the standby one on the basis of the result of the detection obtained from the queue empty detection means. When the active queue empty detection means has detected that the all cells are outputted from the all output ports of the active cell switch module, the switching control means generates a select signal to instruct switching from the active module to the standby one, whereby the active cell switch module is switched to the standby cell switch module after none of the switched cells is left in the active module, hence minimizing the loss of the switched cells stored in the active cell switch module.

In accordance with a further aspect of the present invention, there is provided a network comprising a plurality of the aforementioned transmitters connected mutually via a synchronous network; and a file server connected to at least one transmitter via a communication line. In the network of the present invention, routing information required with up-grading is sent from the file server to the transmitter via a communication line. The transmitter receives the routing information and then stores the same in a data base file or the like. Meanwhile, the routing information once transferred to the transmitter connected to the file server is sent to the overhead of a synchronous frame prescribed in the synchronous network from the transmitter, and then is further sent to any transmitter which is not connected to the file server. Consequently, the routing information can be down-loaded to each transmitter from the file server in a remote site far from any transmitter, and there exists no necessity of connecting the all file servers to the transmitters, hence curtailing the communication cost. Preferably, switching time information is transferred from the file server to each transmitter, so that each transmitter can perform an active/standby switching operation in accordance with the switching time information, whereby every active/standby switching operation can be performed synchronously in the entire network.

The above and other objects, features and advantages of the present invention and the manner of realizing them will become more apparent, and the invention itself will best be understood from a study of the following description and appended claims with reference to the attached drawings showing some preferred embodiments of the invention.

DESCRIPTION OF THE PREFERRED EMBODIMENTS

Figure 1:
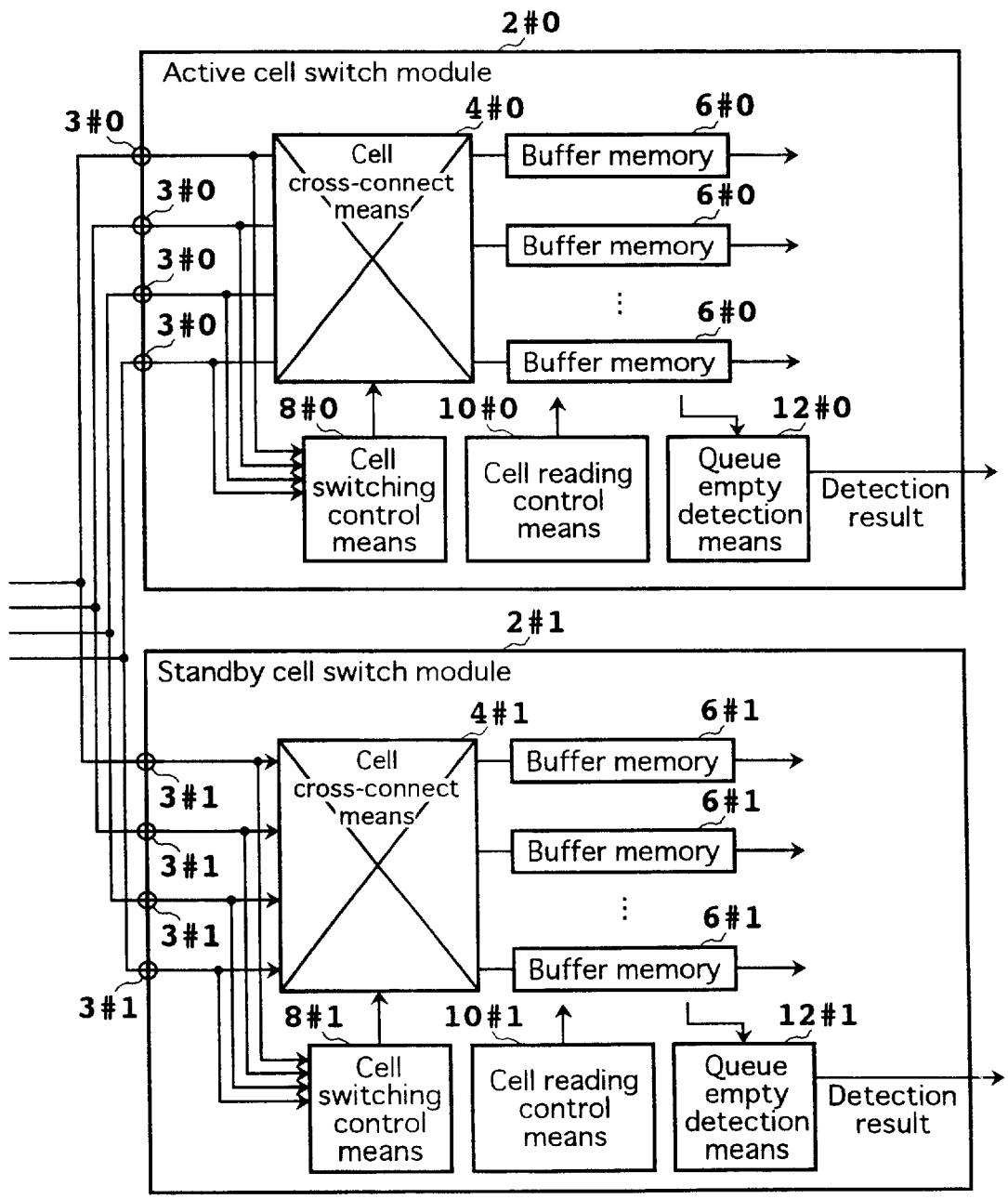
FIG. 1 is a principle block diagram of the present invention.
Figure 2:
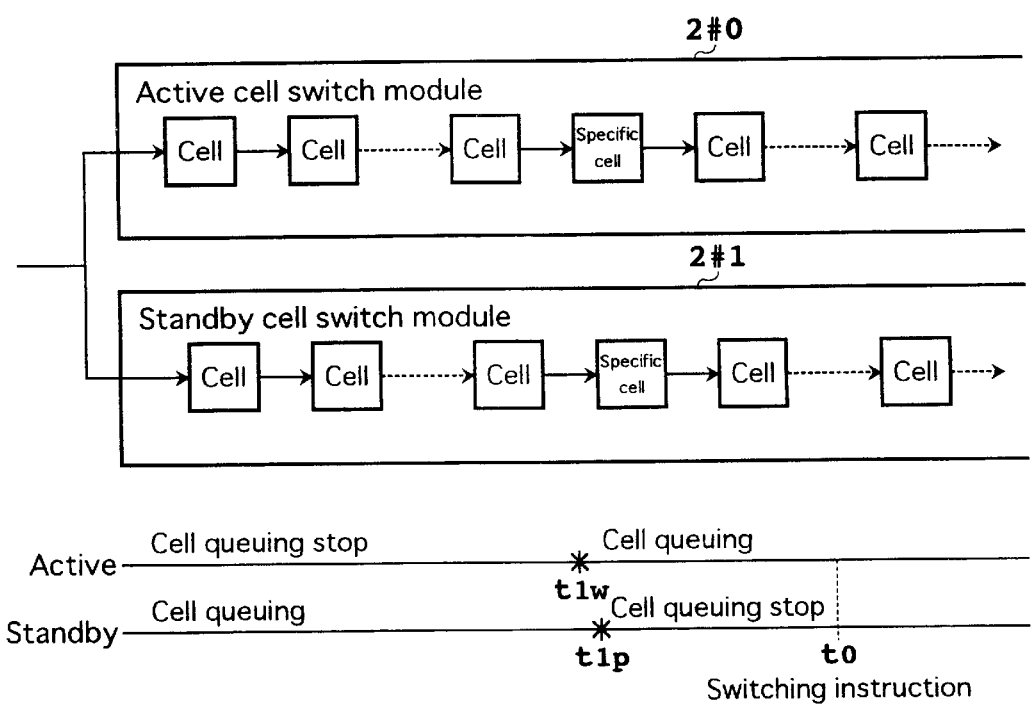
FIG. 2 is an explanatory diagram of the operation performed in FIG. 1.

Prior to describing some preferred embodiments of the present invention, the principle thereof will be explained first with reference to the drawings. FIG. 1 is a principle block diagram of the invention, and FIG. 2 is an explanatory diagram of the operation performed in FIG. 1. In the transmitter of the present invention, as shown in FIG. 1, a double module structure is employed with regard to an active cell switch module 2#0 and a standby cell switch module 2#1. These cell switch modules 2#0 and 2#1 comprise, respectively, a plurality of input ports 3#0 and 3#1 connected to physical lines; cell cross-connect means 4#0 and 4#1 for switching ATM cells in accordance with VPI/VCI of each ATM cell; buffer memories 6#0 and 6#1 for storing cells therein; cell switching control means 8#0 and 8#1 for controlling the input of cells to the cell cross-connect means 4#0 and 4#1; cell reading control means 10#0 and 10#1 for controlling the reading of cells from the buffer memories 6#0 and 6#1; and queue empty detection means 12#0 and 12#1 for detecting whether the all cells have been read out from the buffer memories 6#0 and 6#1.

As shown in FIG. 2, cells are inputted successively from physical lines to the active cell switch module 2#0 and the standby cell switch module 2#1. Suppose now that an active/standby switching instruction is received at time t0. Then the cell switching control means 8#0 and 8#1 check whether a specific first cell (e.g., OAM cell) has been detected or not after reception of the switching instruction. And if the result of such check signifies a detection of the first cell, input of any subsequent cell to the active cell cross-connect means 4#0 is brought to stop, and then any subsequent cell is inputted to the standby cell cross-connect means 4#1. Assuming here that a specific cell is detected at time t1P in the standby cell switch module 2#1 and at time t1W in the active cell switch module 2#0 for example, cells inputted after time tip are written in the buffer memory 6#1 of the standby cell switch module 2#1 and are queued, while cells inputted after time t1W are no longer written into the buffer memory 6#0 of the active cell switch module 2#0.

Consequently in the active cell switch module 2#0 and the standby cell switch module 2#1, cross-connection of cells is switched in response to detection of the same specific first cell, so that even when the cell input times are different in the active cell switch module 2#0 and the standby cell switch module 2#1, it is possible to avoid duplicate queuing of the same cell in the active and standby buffer memories 6#0 and 6#1. When the all cells have been read out from the buffer memory 6#0 in the active cell switch module 2#0, the active module is switched to the standby one to eventually prevent a fault that the same cell is outputted from both of the active cell switch module 2#0 and the standby cell switch module 2#1, also another advantage is attainable in minimizing the loss of the cells.

Figure 3:
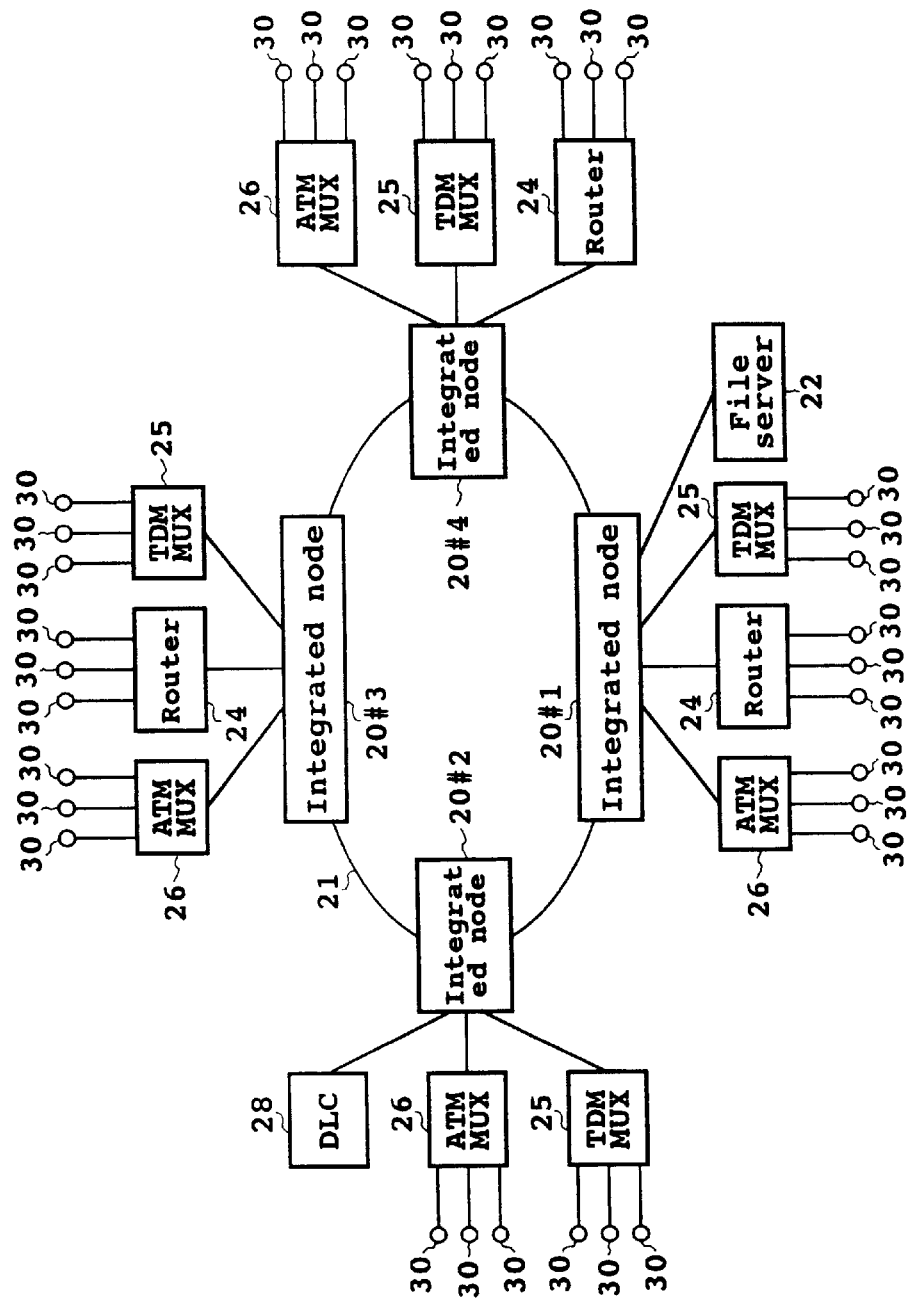
FIG. 3 shows the configuration of a network according to an embodiment of the present invention.

Hereinafter a preferred embodiment of the present invention will be described in detail with reference to the accompanying drawings. FIG. 3 is a block diagram of a network according to the embodiment of the present invention. As shown in this diagram, integrated nodes 20#1–20#4 constitute a ring network via a main transmission line 21 composed of optical fiber (e.g., OC-12 or OC-48). Each of the integrated nodes 20#1–20#4 serves as an ADM (Add Drop Multiplexer) which is a transmitter capable of handling both STM signal and ATM signal. Each of such transmitters 20#1–20#4 contains interfaces adapted for OC-n (where n=3, 12, 48), DS1/DS3 TDM, DS1/DS3 CR (cell relay), DS1/DS3 FR (frame relay), ethernet and so forth. For example, a router 24 and so forth are connected to the ethernet interface; a TDM MUX 25 is connected to the DS1/DS3 TDM interface; and an ATM MUX 26, a DLC 28 and so forth are connected to the DS1/DS3 CR and DS1/DS3 FR interfaces.

Various terminals 30 such as personal computers, ATM terminals and telephone terminals are connected to the router 24, TDM MUX 25, ATM MUX 26, DLC 28 and so forth. A file server 22 down-loads a database, which is composed of program files relative to modification or extension and routing information (such as cross-connect information relative to the VPI/VCI of each ATM cell to be newly held), from a remote site to each of the transmitters connected via WAN or the like. The routing information stored in the database is set by a network manager. The file server 22 is connected to one specific transmitter (e.g., 20#1) or plural transmitters via WAN, LAN, RS232C or the like.

Figure 4:
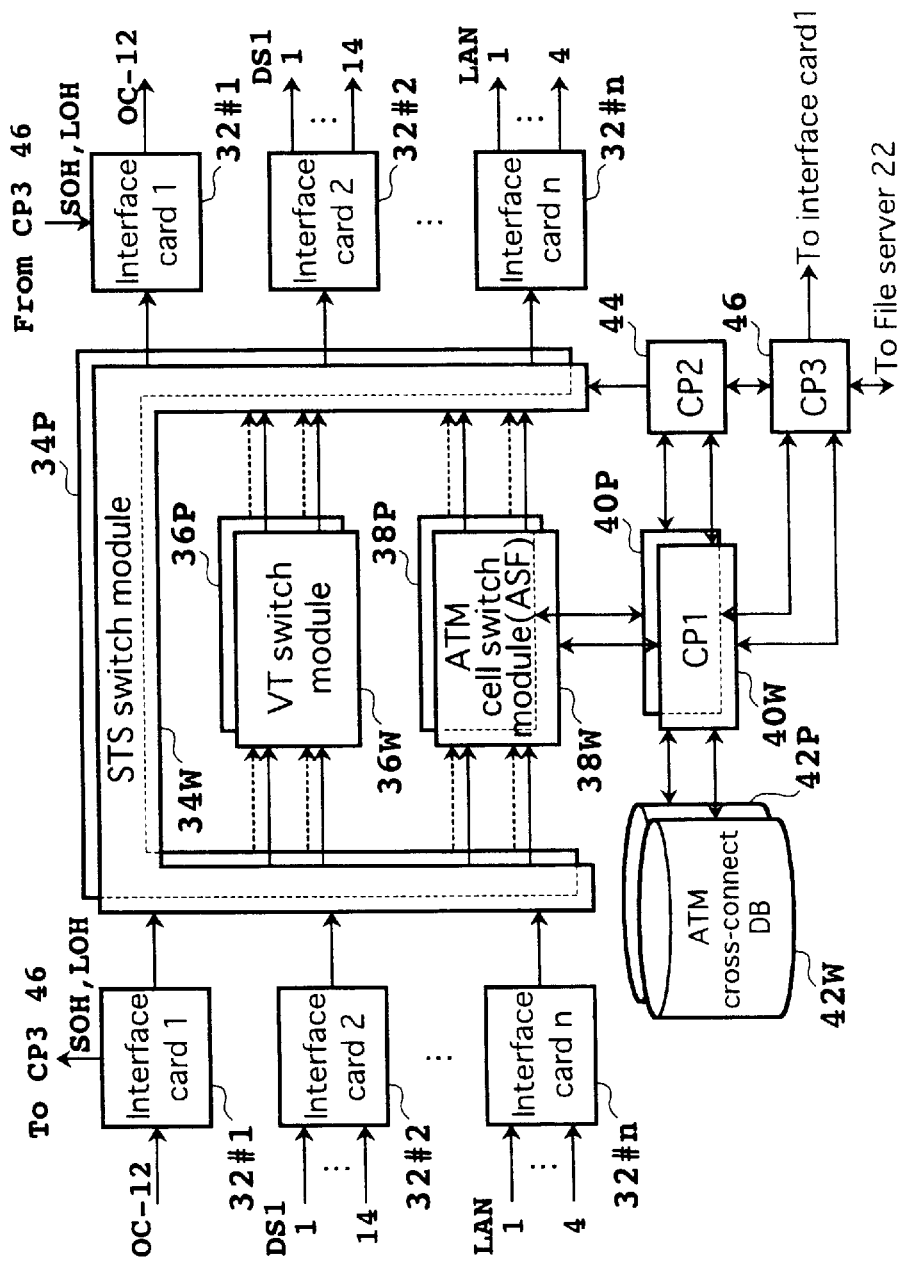
FIG. 4 is a block diagram of a transmitter in an embodiment of the present invention.

FIG. 4 is a block diagram of a transmitter represented by an embodiment of the present invention. The transmitter shown in this diagram is used in the integrated nodes 20#1–20#4 included in FIG. 3. This transmitter comprises card slots for inserting a plurality of interface modules 32#1–32#n, double STS switch modules 34W (active) and 34P (standby), VT switch modules 36W and 36P, ATM cell switch modules (ASF: ATM Switch Fabric) 38W and 38P, CP1 40W and 40P, ATM cross-connect databases (DB) 42W and 42P, a CP2 44, and a CP3 46. Each of the interface modules 32#1–32#n is a line terminator which presides over the interface corresponding to multi-channel services of various kinds, wherein signals prescribed in conformity with external formats are multiplexed/demultiplexed to signals of a common internal format handled in the transmitter (e.g., STS-1 signal (50 MHz)) and then are outputted to the STS switch module 34W or 34P, and an STS-1 signal inputted from the STM switch module 34W or 34P is demultiplexed/multiplexed to a signal of each external format. Upon the operation of the system, the paired interface cards function as active and standby ones, respectively.

The interface cards 32#1–32#n serve as interfaces adapted for OC-n (where n=3, 12, 48), DS1, DS3, LAN and so forth. In the data link layer of services that handle ATM cells in such interfaces, there are included LAN signals relative to ethernet packets and so forth, DS1/DS3 UNI (User Network Interface) signals, DS1/DS3 signals used in frame relay/cell relay services, and OC-3 UNI, OC-N (where N=3, 12, 48) signals using an optical interface for SONET inclusive of a case where cells are mapped to the STS-1 signal.

For example, 32#1 denotes an OC-12 interface card, and 32#2 denotes a DS1 interface card containing channels 1–14. Frames of various formats such as TDM, CR and FR may be mapped to frames of DS1. For example, frames of STM signal are mapped to channels 1 and 2; ATM cells are mapped to channels 3 and 4; frames of STM signal in channels 1 and 2 are mapped to VT frames, and channels 3 and 4 are mapped to STS-1 and are outputted to the STS switch modules 34W and 34P. Denoted by 32#n is, for example, a LAN interface card containing channels 1–4. Data packets used in LAN are inputted to the LAN interface card 32#n. Each LAN packet is converted from the IP address of its packet header to the corresponding VPI/VCI and then is assembled into ATM cells, which are subsequently mapped to the STS-1 signal and are outputted to the STS switch modules 34W and 34P.

Figure 5:
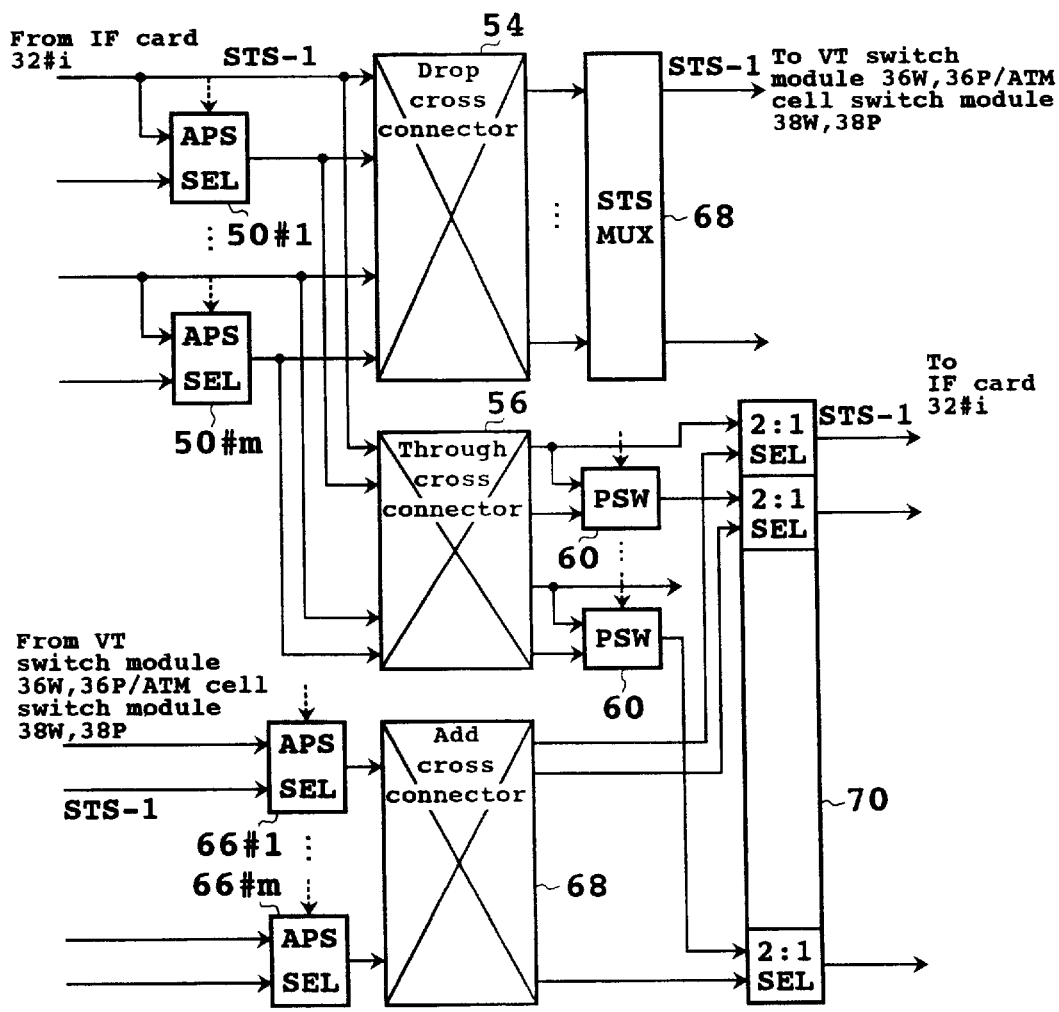
FIG. 5 is a block diagram of an STS switch module in FIG. 4.

The STS switch modules 34W and 34P are in a double structure consisting of active and standby ones. FIG. 5 is a function block diagram of the STS switch modules in FIG. 4. As shown in this diagram, the STS switch modules 34W, 34P have APS SEL 50#1–50#m, a drop cross-connector 54, a through cross-connector 56, an STS MUX 58, a PSW 60, APS SEL 66#1–66#m, an add cross-connector 68, and a 2:1 SEL 70. The APS SEL 50#1–50#m perform, under control of the CP2 44, automatical protection switch to select either the active or standby module for processing the STS-1 signal obtained from the interface card 32#i (where i=1–n). The drop cross-connector 54 outputs the STS-1 signal, which is supplied from the interface card 32#i (where i=1–n) and is received at each input port, to the corresponding output port in accordance with routing information. The STS MUX 58 remaps the STS-1 signal obtained after pointer processing and so forth, and then outputs the remapped STS-1 signal to the VT switch modules 36W, 36P and the ASF 38W, 38P. The through cross-connector 56 allows the STS-1 signal, which is obtained from the interface card 32#i (where i=1–n) and is received at each input port, to pass through the corresponding output port in accordance with the routing information, and then outputs the signal to the PSW (pass switch) 60 or the 2:1 SEL 70. The output of the through cross-connector 56 is rendered valid when the STS-1 signal from the interface card 32#i is allowed to pass through (e.g., by relay function) directly without any VT switching or ATM cell switching and is outputted to the interface card 32#j. The PSW 60 executes, under control of the CP2 44, pass switch of the output signal of the through cross-connector 56. The APS SEL 66#1–66#m select, under control of the CP2 44, the active signal from the output signals of the VT switch modules 36W, 36P or the ASF 38W, 38P. According to the routing information, the add cross-connector 68 outputs the VT frame or STS-1 signal received at each input port to a desired output port.

The 2:1 SEL 70 selects, under control of the CP2 44, either the signal switched and outputted directly as STS-1 without being processed or the signal switched by the VT switch modules 36W, 36P or the ASF 38W, 38P, and then outputs the selected signal to the interface card 32#i. Cross connection in the cross-connectors 54, 56, 68 and switch control in the PSW 60 and the 2:1 SEL 70 are executed by the CP2 44 of network manager per physical line according to the routing information set at the start or change in use.

Figure 6:
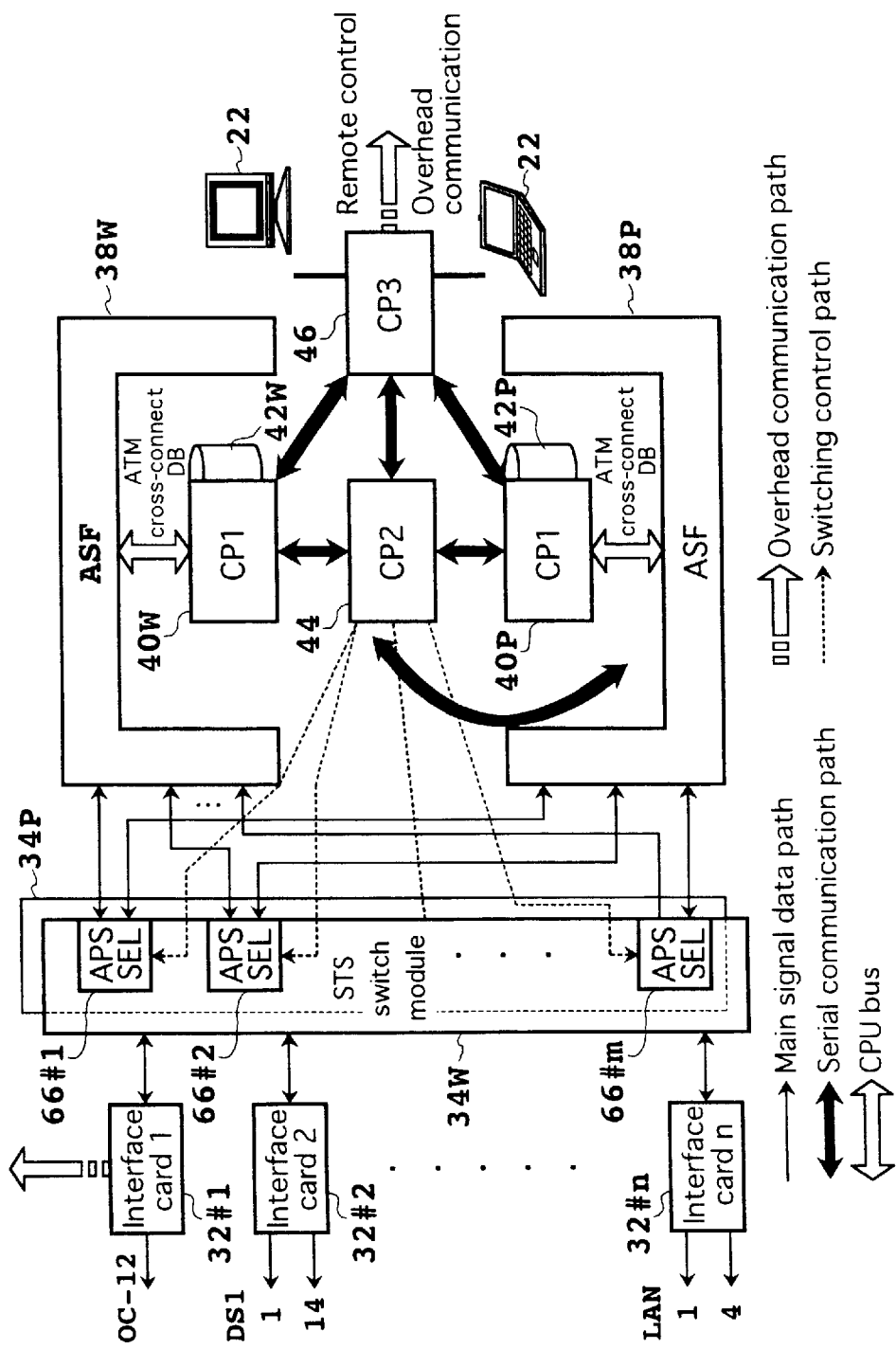
FIG. 6 shows paths of the transmitter in FIG. 4.

FIG. 6 shows paths of the transmitter in FIG. 4. As shown in this diagram, the ASF 38W, 38P are connected to the CP1 40W, 40P via a CPU bus, and to the STS switch modules 34W, 34P via a main signal data path, respectively. The processors in the CP1 40W, 40P, the CP2 44 and the CP3 46 are connected via a serial communication path. The CP2 44 and the STS switch modules 34W, 34P are connected via a switch control path and so forth. The interface card 32#1 containing a main transmission line 21 and the CP3 46 are connected via an overhead communication path.

Figure 7:
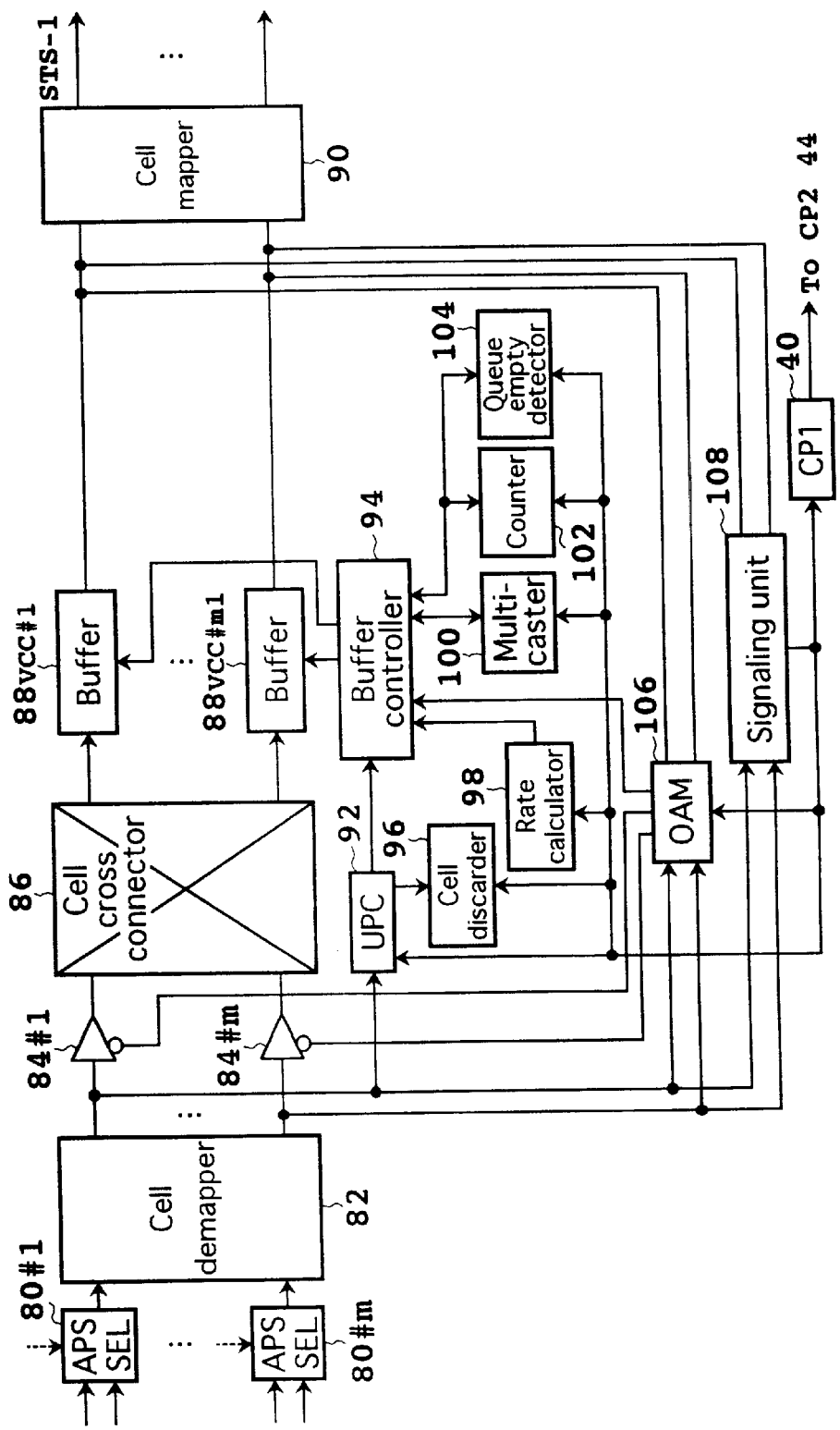
FIG. 7 is a block diagram of an ASF in FIG. 4.

FIG. 7 is a function block diagram of the ASF included in FIG. 4. As shown in this diagram, the ASF 38W, 38P comprise APS SEL 80#1–80#m, a cell demapper 82, tristate buffers 84#1–84#m, a cell cross-connector 86, buffers 88vcc#1–88vcc#ml, a cell mapper 90, a UPC (Usage Parameter Control) 92, a buffer controller 94, a cell discarder 96, a rate calculator 98, a multi-caster 100, a counter 102, a queue empty detector 104, an OAM (Operation Administration and Maintenance) unit 106, and a signaling unit 108. The APS SEL 80#i selects, under control of the CP2 44, the active STS-1 signal outputted from the STS switch module 34W or 34P. The cell demapper 82 extracts the ATM cell mapped to the STS-1 signal obtained from the APS SEL 80#i, and then outputs the ATM cell to the relevant signal line provided correspondingly to each APS SEL 80#i. In response to a control signal from the OAM cell unit 106, the tristate buffers 84#1–84#m perform control of output or non-output of each ATM cell to the cell cross-connector 86. When the ATM cell is outputted from each tristate buffer 84#i to the cell cross-connector 86, such output is executed, in the standby ASF 38P, during a period until switching to the active ASF from detection of the OAM cell outputted from the demapper 82 to the signal line, where the tristate buffer 84#i is connected, in response to a manual switch instruction from the CP1 40P, or such output is executed, in the active ASF 38W, in a normal operation mode and during a period until detection of the OAM cell outputted from the cell demapper 82 to the signal line, where the tristate buffer 84#i is connected, in response to a manual switch instruction from the CP1 40P.

A delay difference is caused during a period in which the STS-1 signal outputted from the STS module 34W is separated into ATM cell and is inputted to the active and standby tristate buffers 84#i. For example, when queuing of the ATM cell is switched from the active ASF 38W to the standby ASF 38P in response to a control signal from the CP2 44, in case the ATM cell is inputted earlier to the active ASF, the ATM cell is queued in both the active and standby ASF to be thereby outputted in duplication. For the purpose of preventing this problem, the input port of the cell cross-connector 86 is switched while being triggered by detection of the OAM cell in the active and standby ASF 38W and 38P, so that the ATM cell subsequent to the OAM cell is queued in the standby ASF 38P without being queued in the active ASF 38W, hence exactly avoiding duplicate transmission of the same ATM cell from the active and standby ASF. The cross-connector 86 refers to the VPI/VCI of the ATM cell supplied to each input port in accordance with the cross-connect DB 42, and cross-connects the ATM cell to the buffer 88vcc#i of the VC channel corresponding to the relevant VPI/VCI. The buffers 88vcc#i are provided in conformity with individual VC channels, and perform successive writing of the ATM cells outputted from the cross connector 86 and also successive reading of the ATM cells in response to each command from the buffer controller 94. Although the buffers 88vcc#i (where i=1–ml) may be provided separately as shown in FIG. 7, a common memory is also employable with allocation of its areas in use to the individual VC channels respectively.

The cell mapper 90 receives ATM cells outputted from the VC channel buffers 88vcc#i (where i=1–ml) corresponding to the physical lines connected to the STS switch modules 34W, 34P, and OAM cell outputted from the OAM cell unit 106, and signaling cell outputted from the signaling unit 108, then maps each ATM cell to the STS-1 signal, and outputs the same to the relevant physical line connected to the STS switch modules 34W, 34P. The UPC unit 92 counts the VC traffic by means of the counter 102 and, in accordance with the setting, drives the cell discarder 96 to execute either discard of the cell or change of the CLP (cell loss priority). The buffer controller 94 controls writing of ATM cells in the buffers 88vcc#i (where i=1–ml) or reading of ATM cells therefrom. The rate calculator 98 collects various statistical information. The multi-caster 100 executes a process of point-to-multipoint topology. The queue empty unit 104 calculates the number of remaining queues (number of writes minus number of reads) performed by the buffer controller 94 to the buffer 88vcc#i and, after input of a manual switch signal from the CP1 40, notifies the CP1 40 that the number of remaining queues is zero, i.e., none of queued ATM cells is existent in the all buffers 88vcc#i (where i=1–ml).

Figure 8:
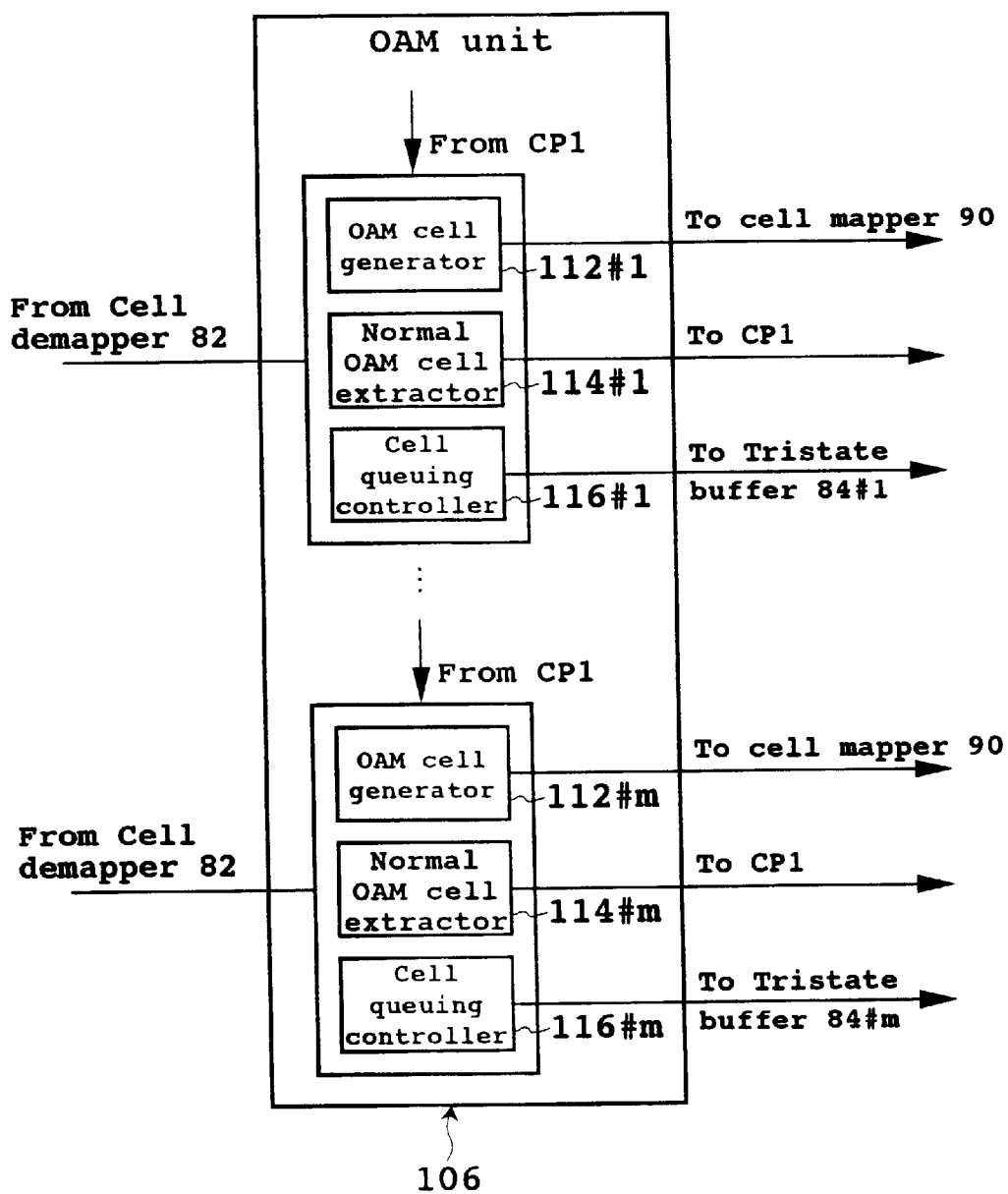
FIG. 8 is a block diagram of an OAM unit in FIG. 7.

FIG. 8 is a function block diagram of the OAM unit included in FIG. 7. As shown in this diagram, the OAM unit 106 comprises OAM cell generators 112#i (where i=1–m), normal OAM cell extractors 114#i (where i=1–m), and cell queuing controllers 116 #i (where i=1–m), all of which are provided correspondingly to individual output signal lines of the cell demapper 82. Each of the OAM cell generators 112#i generates OAM cells. An OAM cell is transmitted for giving an alarm, monitoring and reporting any error, and further for requesting an answer to the OAM cell. Transmission of an OAM cell for requesting an answer is performed to switch, upon reception of the answer OAM cell, queuing of ATM cell from the active ASF 38W to the standby ASF 38P with regard to the relevant physical line to which the answer OAM cell is inputted. In addition, in case the answer OAM cell fails to be received within a fixed period of time, each OAM cell generator 112#i retransmits an answer request OAM cell again or transmits another answer request OAM cell having VPI/VCI of a different route, so as to ensure exact reception of the answer OAM cell with certainty.

The VPI/VCI information set in the answer request OAM cell by each OAM cell generator 112#i may be the one that renders the answer OAM cell receivable by the OAM cell generator 112#i, and it is inputted from the CP1 40W for example. And a plurality of answer request OAM cells may be sent as well. The normal OAM cell extractor 114#i extracts a normal OAM cell and outputs the same to the CP1 40W. Upon reception of an answer OAM cell, the cell queuing controller 116#i stops, in the active ASF 38W, output of the ATM cell from the tristate buffer 84#i, or permits, in the standby ASF 38P, output of the ATM cell from the tristate buffer 84#i.

Figure 9:
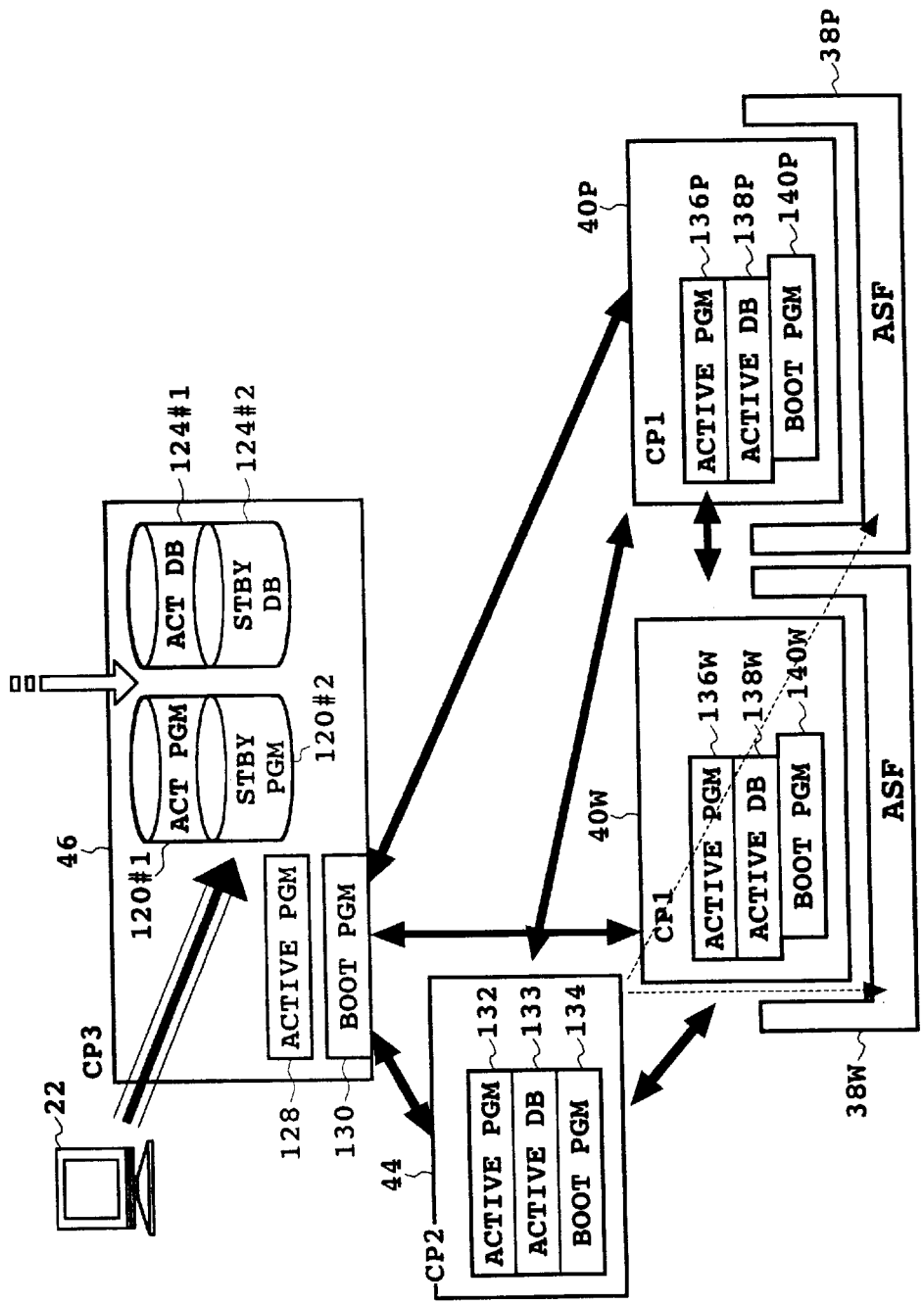
FIG. 9 shows the layout of programs and databases in an embodiment of the present invention.

FIG. 9 shows the layout of programs and databases in the embodiment of the present invention. The CP1 40W, 40P are processors having active program (ACT PGM) areas 136W, 136P of RAMs or the like to store programs, active database (ACT DB) areas 138W, 138P of RAMs or the like to store databases, and boot program (BOOT PGM) areas 140W, 140P of ROMs or the like to store boot programs. These processors control the ASF 38W, 38P, respectively. Programs for controlling the ASF 38W, 38P are stored in the active program areas 136W, 136P. Cross-connect databases 42W, 42P for controlling the ASF 38W, 38P are stored in the active database areas 138W, 138P. And boot programs for starting up the programs after copying the programs and databases from the CP3 46 into the active program areas 136W, 136P and the active database areas 138W, 138P are stored in the boot program area 140W, 140P.

The CP2 44 is a processor having an active program (ACTIVE PGM) area 132 of a RAM or the like to store programs, an active database (ACTIVE DB) area 133 of a RAM or the like to store a database, and a boot program (BOOT PGM) area 134 of a ROM or the like to store a boot program. Programs for controlling the STS switch modules 34W, 34P or commanding manual switch of the ASF 38W, 38P are stored in the active program area 132. Routing information for controlling cross-connection and so forth in the STS switch modules 34W, 34P is stored in the active database area 133. And a boot program for starting up the programs by copying the programs and database from the CP3 46 into the active program area 132 and the active database area 133 is stored in the boot program area 134. When necessary, the CP2 44 is formed into a double structure of active and standby ones similarly to the CP1 40W, 40P for the purpose of up-grading the STS switch modules 34W, 34P and enhancing the reliability of the transmitter.

The CP3 46 is a processor having an active program (ACT PGM) area 120#1 to store programs for the active CP1 40W and CP2 44, an active database (ACT DB) area 124#1 to store cross-connect databases for the active CP1 40W and CP2 44, a standby program (STBY PGM) area 120#2 to store a program for the standby CP1 40P, a standby database (STBY DB) area 124#2 to store a cross-connect database for the standby CP1 40P, an active program (ACTIVE PGM) area 128 to store a program for the CP3 46, and a boot program (BOOT PGM) area 130 to store a boot program for starting up the program. The program areas 120#1, 120#2 and the database areas 124#1, 124#2 are stored in a magnetic disk. The CP3 46 further has a battery-powered clock for management of time. In case the CP2 44 is formed into a double structure, a standby program area and a standby database area are provided for a standby of the CP2 44, as in the aforementioned case of the standby CP1 40P.

In running the network, the CP3 46 of one transmitter 20#1 accommodating the main transmission line 21 in FIG. 3 is connected to the database server 22 by means of WAN or the like. The reason for not connecting the CP3 46 of the all transmitters 20#2–20#4 to the database server 22 is to curtail the required communication cost. The CP3 46 is connected via an overhead communication path to the interface card 32#1 where the main transmission line 21 is accommodated.

Hereinafter the operation of the transmitter in FIG. 4 will be described.

(a) Operation in normal mode

Figure 10:
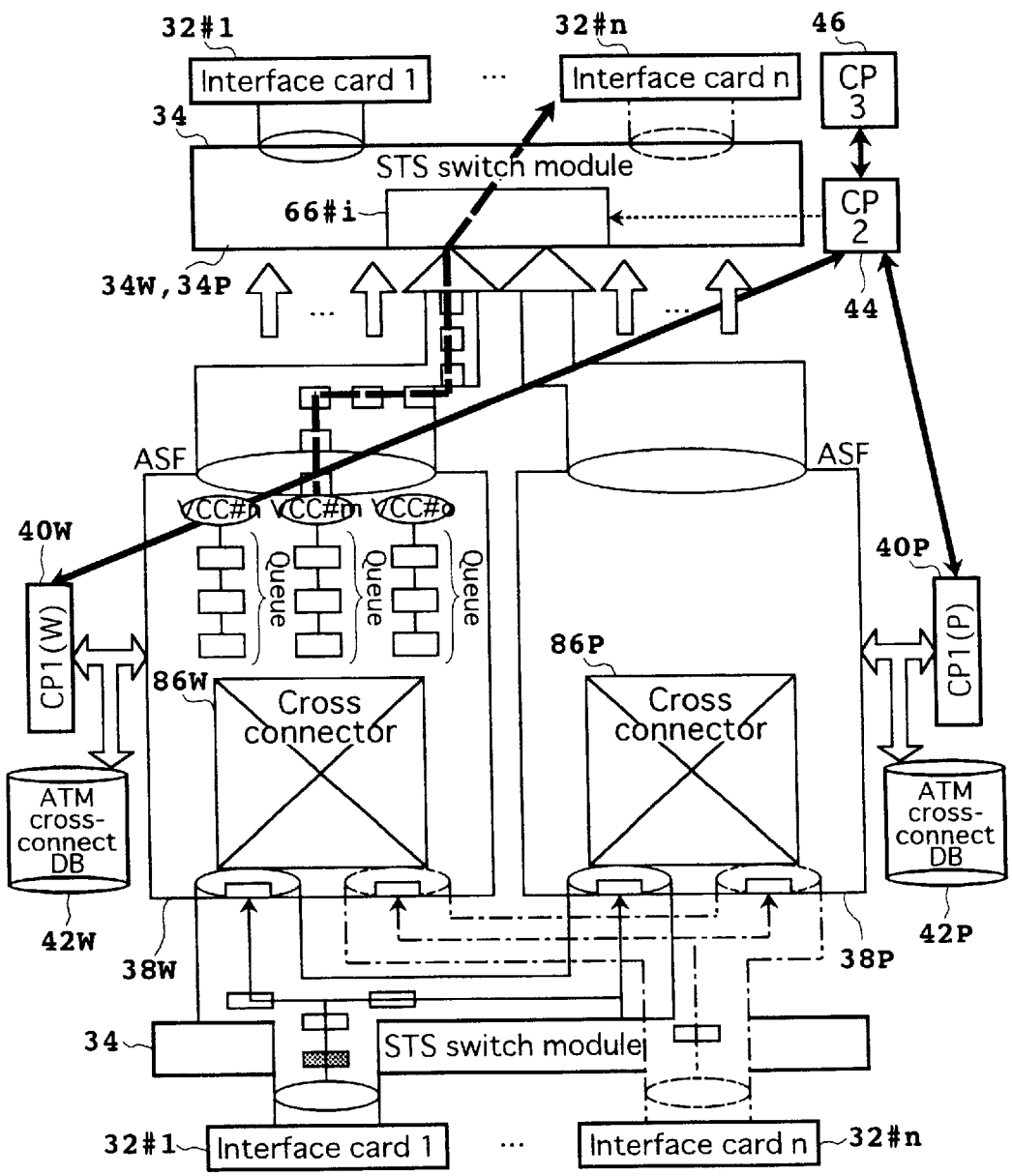
FIG. 10 shows a normal state.

FIG. 10 shows the state in a normal mode. In the normal mode, the STS switch modules 34W, 34P, the VT switch modules 36W, 36P, the ASF 38W, 38P, the CP1 40W, 40P, and the ATM cross-connect DB 42W, 42P are used as one for active and another for standby, respectively. Various input signals from external sources are terminated at the interface cards 32#1–32#n and then are converted into a unified module interface signal (e.g., STS-1 format: 50 MHz), and thereafter the converted signal is inputted to the STS switch modules 34W, 34P. In the active STS switch module 34W shown in FIG. 5, the APS SEL 50#1–50#m select, under control of the CP2 44, one of STS-1 signals outputted from the paired active and standby interface cards, and then output the selected signal to the drop cross-connector 54 and the through cross-connector 56. Meanwhile, the STS-1 signal outputted from one interface card 32#j is inputted directly to the cross connectors 54, 56.

The drop cross-connector 54 executes VT level cross connection or ATM cell cross connection according to the routing information in the cross-connect database and, after assembling an STS-1 signal by the STS MUX 58, outputs the STS-1 signal to the VT switch modules 36W, 36P and the ASF 38W, 38P. The through cross-connector 56 executes cross connection of any STS-1 signal other than the above, and then outputs the same to the 2:1 SEL 70 and the PSW 60. The VT switch module 36W switches the input VT frame and outputs the same to the STS switch module 34W. Meanwhile, the APS SEL 80#1–80#m in the ASF 38W shown in FIG. 7 select, under control of the CP2 44, the STS-1 signal outputted from the active STS switch module 34W and then outputs the selected signal to the cell demapper 82. Subsequently the cell demapper 82 extracts the ATM cell mapped to the STS-1 signal and then outputs the extracted cell. In the normal mode, the tristate buffer 84#i (where i=1–m) outputs the ATM cell under control of the cell queuing controller 116#i in the OAM unit 106.

The cross connector 86 executes cross connection according to the routing information in the cross-connect database 42W, and outputs the ATM cell to the buffer 88vcc#i of the channel corresponding to the VPI/VCI of the ATM cell. The buffer controller 94 instructs each buffer 88vcc#i to write or read the ATM cell. Thus, ATM cells of the relevant channel are stored successively in the buffer 88vcc#i and are queued therein. For example, as shown in FIG. 10, ATM cells of VC channels VCC#n, VCC#m, VCC#o are queued in the buffers 88vcc#n, 88vcc#m, 88vcc#o respectively. And the ATM cells thus queued are read out therefrom successively. The cell mapper 90 maps the ATM cells of relevant channels (e.g., ATM cells of VC channels VCC#n, VCC#m, VCC#o) to the STS-1 signal, and then outputs the signal to the STS switch modules 34W, 34P.

The UPC 92 counts each VC traffic by means of the counter 102 and, according to the setting, executes either discard of the cell or change of the CLP by means of the cell discarder 96. The rate calculator 98 collects various statistical information and then outputs the same to the CP1 40W. The multi-caster 100 executes a process of point-to-multipoint topology. In the normal mode, the normal OAM cell extractor 114#i (where i=1–m) detects a normal OAM cell and notifies the CP1 40w of the OAM information. The OAM cell generator 112#i (where i=1–m) converts the OAM information, which is obtained from the CP1 40W, into an OAM cell and, by controlling the buffer controller 94, stops reading the ATM cell from the relevant buffer 88vcc#j, and then outputs the OAM cell to the cell demapper 90. The signaling unit 108 notifies the CP1 40W of the signaling information, then converting the signaling information obtained inversely from the CP1 40W into a signaling cell, and outputs the same to the cell demapper 90.

The APS SEL 66#i (where i=1–m) in the STS switch module 34W selects, under control of the CP2 44, the STS-1 signal outputted from the active VT switch module 36w and the active ASF 38W, and then outputs the selected signal to the add cross-connector 68. Subsequently the add cross-connector 68 cross-connects the input STS-1 signal to the 2:1 SEL 70 according to the routing information. The 2:1 SEL 70 selects, under control of the CP2 44, the STS-1 signal outputted from the through cross-connector 56 or the add cross-connector 68, and then outputs the selected signal to the relevant interface card 32#i (where i=1–n). Thereafter the interface card 32#i (where i=1–n) converts the STS-1 signal, which is outputted from the STS switch module 34w, into a desired external format and then sends the converted signal to each transmission line.

(b) Up-grade

Up-grade of the system is performed by switching the standby ASF module 38P or by changing, for example, the DS1, DS3/TDM that have been in use to DS1, DS3/CR, FR without switching the standby ASF module 38P, and extending the ATM cell band. In the case of switching the ASF module 38P, for example, a module of 2.5 GHz band is switched to a module of a 5 GHz band. It becomes necessary, with such up-grade, to change the program in the cross-connect DB 42P or the CP1 40P. Further with up-grade of the transmitter 20#1, the cross-connect DB 42P of the other transmitters 20#2–20#4 also need to be changed, as in an exemplary case where new logical connection of ATM cells is set. In compliance with requirements, the network manager up-grades the standby ASF module 38P to a new module (e.g., from a module of 2.5 GHz capacity to a module of 5 GHz capacity), and prepares a database to store modified routing information for the VT switch module 36P or the ASF switch module 38P, or prepares a modified program, and then stores such program in the file server 22.

Figure 11:
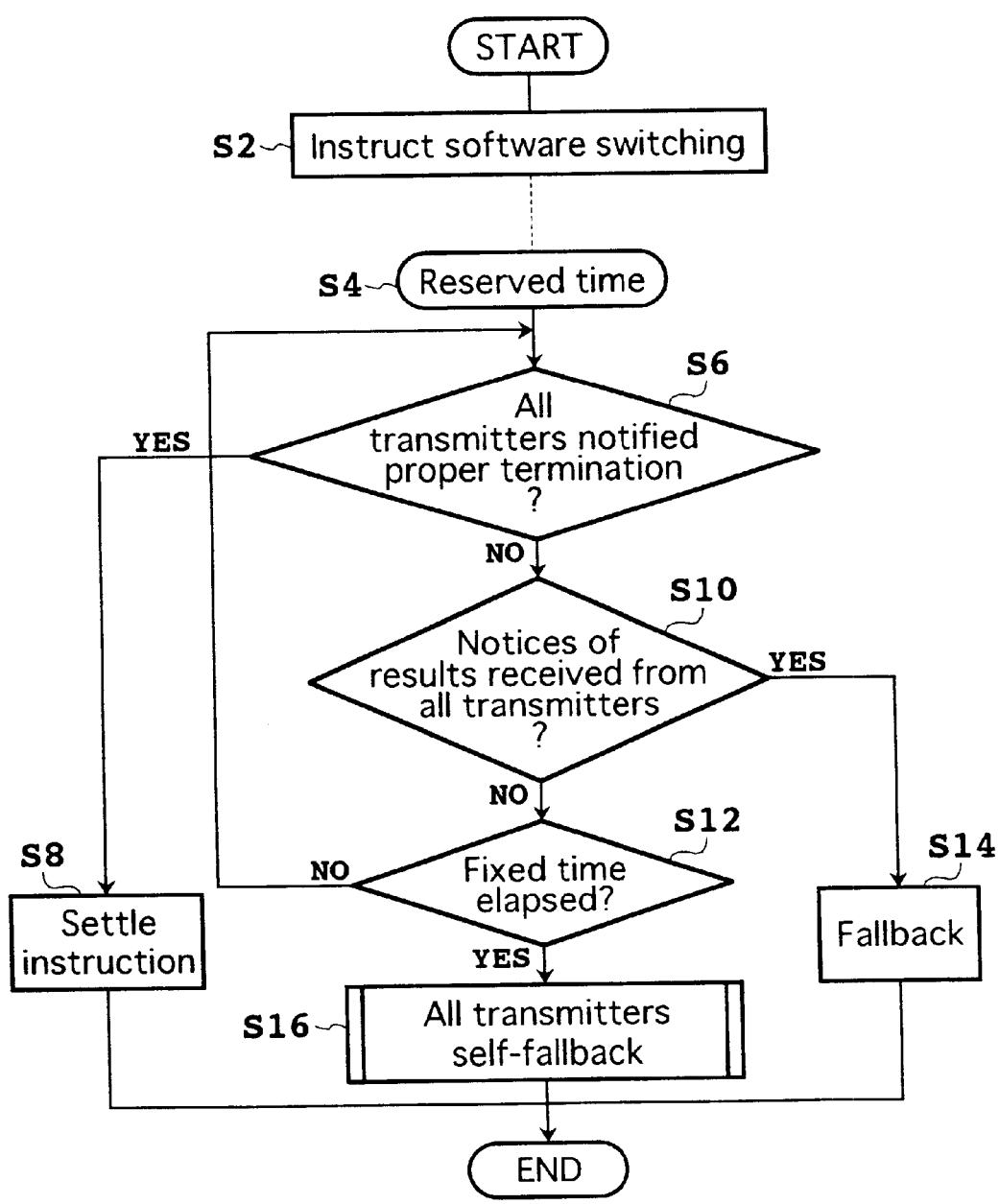
FIG. 11 is a flowchart of the operation performed in up-grading the network.
Figure 12:
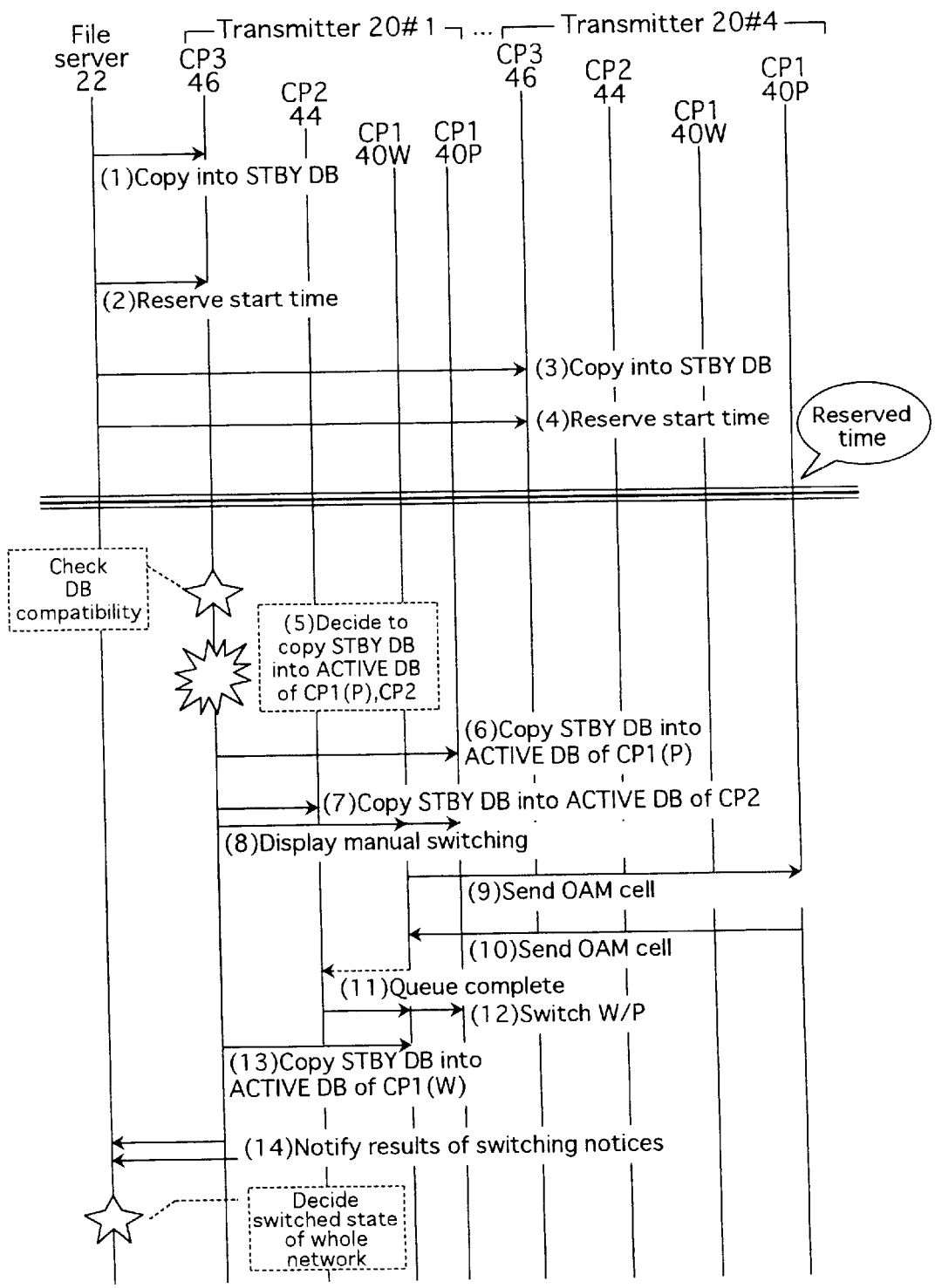
FIG. 12 is a sequence chart in up-grading the network.

FIG. 11 is a flowchart of the operation performed in up-grading the network, and FIG. 12 is a sequence chart in up-grading the network. At step S2 in FIG. 11, the network manager instructs the file server 22 to switch the programs and databases. Subsequently at step S4, the network manager specifies the program/database switch start time to a desired hour (e.g., dawn) when the ATM communication frequency is low. And in response to such instructions at steps S2 and S4, the file server 22 executes the following processes, as shown in FIG. 12.

(1) The file server 22 sends the up-graded program and database to the CP3 46 of the transmitter 20#1 via a communication line such as WAN. The CP3 46 receives the up-graded program and database, and then stores the same in the standby program area 120#2 and the standby database area 124#2, respectively.

(2) The file server 22 sends the start time to the CP3 46 of the transmitter 20#1. Upon reception of the start time, the CP3 46 sets the reserved time in the local clock and then waits for the hour.

(3) When sending the program and database to any of the transmitters 20#2–20#4 not connected via WAN or the like, the file server 22 sends the program and database to the interface card 32#1, which accommodates the main transmission line 21, via an overhead communication path by way of the CP3 46 of the connected transmitter 20#1, then sets the program and database, together with the addresses of the opposite transmitters 20#2–20#4, in the frames of remote control information fields of the OC-n line overhead (LOH) and section overhead (SOH) by the interface card 32#1, and sends the data to the main transmission line 21. The transmitters 20#2–20#4 separate PATH signals from the line overhead (LOH) and the section overhead (SOH) then transmit the data to the CP3 46 via the overhead communication path. The CP3 46 receives, via the overhead communication path, the program and database addressed to the relevant transmitter, and then stores the received program and database in the standby program area 120#2 and the standby database area 124#2, respectively.

(4) The file server 22 sends the start time to each of the transmitters 20#2–20#4 via the overhead communication path by way of the CP3 46 of the transmitter 20#1, as in (3) mentioned above. The CP3 46 sets the reserved time in the local clock and then waits for the hour. Upon arrival of the reserved time, a timer interrupt is executed from the clock, so that the CP3 46 checks compatibility of the program and database with those stored in the standby program area 120#2 and the standby database area 124#2 on the basis of predetermined combination information. And if the compatibility is improper, the CP3 46 does not copy the program or database any further. Meanwhile, if the compatibility is proper, the CP3 46 performs continuous copying.

(5) The CP3 46 makes a decision that the standby program and database are to be copied into the standby CP1 40P and CP2 44.

(6) The CP3 46 copies the standby program into the active program area 136P of the standby CP1 40P and also copies the standby cross-connect database 124#2 into the active database area 138P while communicating with the boot program of the CP1 40P via the serial communication path.

(7) The CP3 46 copies the standby program into the active program area 132 of the CP2 44 and also copies the standby cross-connect database 124#2 into the active database area 133 while communicating with the boot program of the CP2 44 via the serial communication path.

(8) The CP3 46 outputs a manual switch command to the CP1 40W, 40P and the CP2 44. In response to the manual switch command, the CP2 44 executes active/standby switch with regard to the STS switch modules 34W, 34P and the VT switch modules 36w, 36P.

(9) OAM cell output In response to the manual switch command, the active CP1 40W sends OAM information (including VPI/VCI) to each OAM cell generator 112#i (where i=1–m) of the ASF 38W in FIG. 7 for requesting an answer. The VPI/VCI relates to at least one logical connection contained in the network to which the OAM cell is outputted.

There may occur a situation where, with extension of the ATM network, an ATM line is newly set and some unused physical line for connecting STS switch module 34W to the ASF 38P is put to use. Regarding such a physical line, none of OAM cell is transmitted since no routing thereof is set in the active CP1 40W and consequently no ATM cell is inputted. The reason is based on that, with regard to any unused physical line, a problem of outputting ATM cells in duplication is never raised despite forcibly switching the queuing of ATM cells. The OAM cell generator 112#i instructs the buffer controller 94 to temporarily stop the reading from the VC channel buffers 88vcc#i1–88vcc#im contained in the STS-1 signal to which the output OAM cell is mapped, and generates an answer request OAM cell in accordance with the OAM information, and then outputs the OAM cell to the cell mapper 90. This OAM cell is mapped to the STS-1 signal by the cell mapper 90 and then is outputted from the interface card 32#i via the STS switch module 34W. Subsequently the OAM cell sent from the interface card 32#i is received by the interface card 32#n of the transmitter in case the relevant terminal or ethernet is contained, and further by the other transmitter that relays the OAM cell.

(10) Manual switch standby mode

Figure 13:
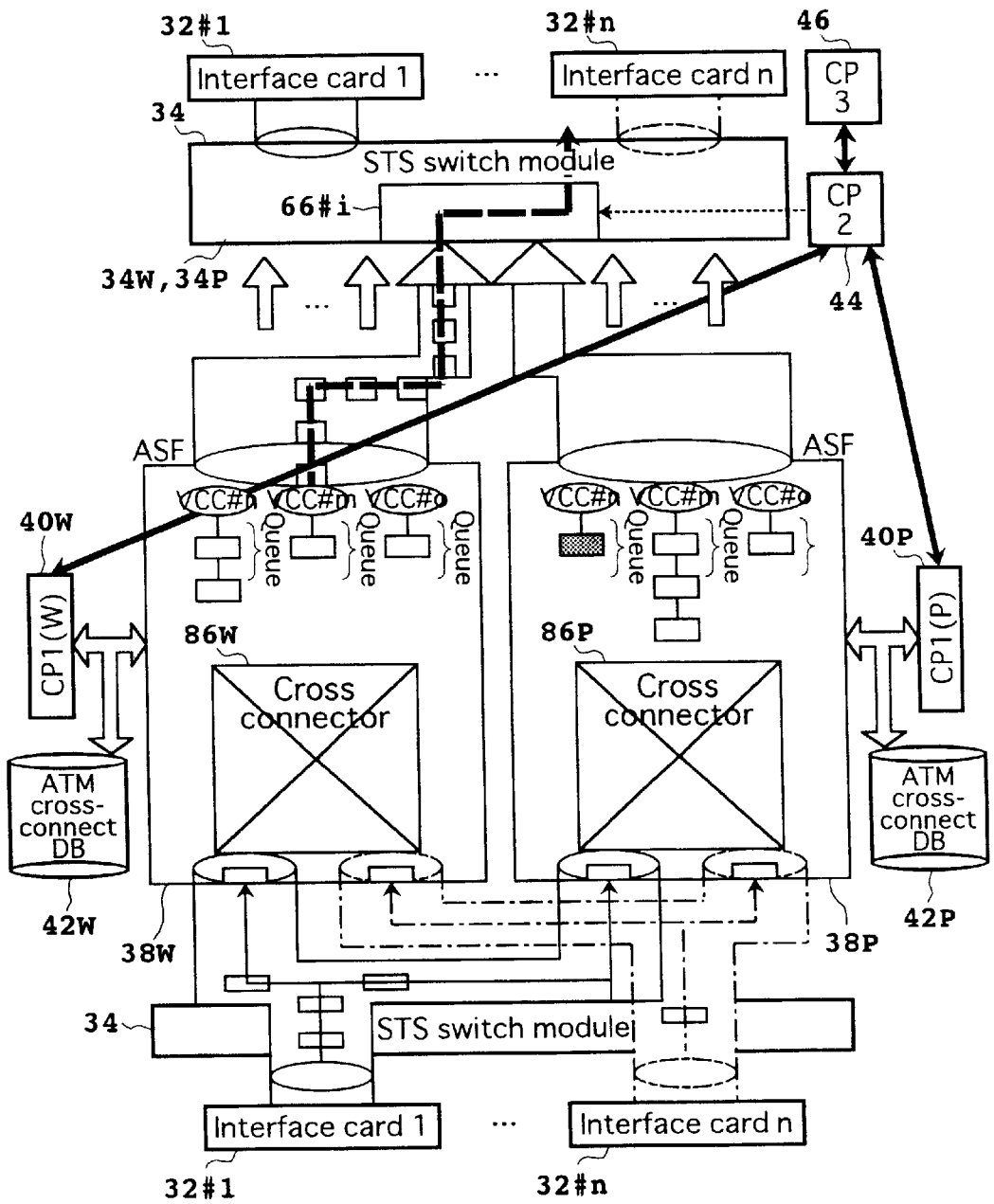
FIG. 13 shows a standby state for manual switching.

FIG. 13 shows a state in a manual switch standby mode. In response to receipt of the OAM cell, the relevant terminal or interface card of the transmitter or the OAM cell unit 106 sends an answer OAM cell therefrom. The answer OAM cell is sent via an interactive transmission line in the reverse direction to the answer request OAM cell and then is received by the interface card of the transmitter 20#1 having sent the OAM cell. Subsequently the answer OAM cell is received via the STS switch module 34W by the cell queuing controller 116#i of the OAM unit 106 connected to the same signal line as that of the OAM cell generator 112#i having generated the answer request OAM cell of the active ASF 38W, and by the corresponding cell queuing controller 116#i of the standby ASF 38P. Upon detection of the answer OAM cell, the cell queuing controller 116#i notifies the OAM cell generator 112#i and the CP1 40W on such detection and, in accordance with the active/standby state of the self-module notified from the CP1 40W, turns the output of the tristate buffer 84#i to high impedance in the case of an active module, or starts output of the ATM cell from the tristate buffer 84#i in the case of a standby module.

Consequently, any ATM cells inputted thereafter to the ASF 38W, 38P from the interface card 32#i having received the answer OAM cell are queued in the standby ASF 38P instead of the active ASF 38W, and then the operation is shifted to a manual switch standby mode as shown in FIG. 13. In this manner, queuing of ATM cells is switched in response to a detection of the answer OAM cell as a trigger per physical line where the answer OAM cell is inputted, so that the ATM cells are not sent in duplication despite any delay difference between inputs of the ATM cells to the ASF 38W and those to 38P. A trigger for switching is not limited merely to an answer OAM cell alone, and an answer request OAM cell may be used as well (e.g., in the transmitter 20#2 or the like that relays an answer request OAM cell). If the answer OAM cell fails to be received after a lapse of a predetermined time from output of an answer request OAM cell, the OAM cell generator 112#i sends another answer request OAM cell again, so as to ensure exact reception of the answer OAM cell and to execute proper switching.

(11) Manual switch mode

Figure 14:
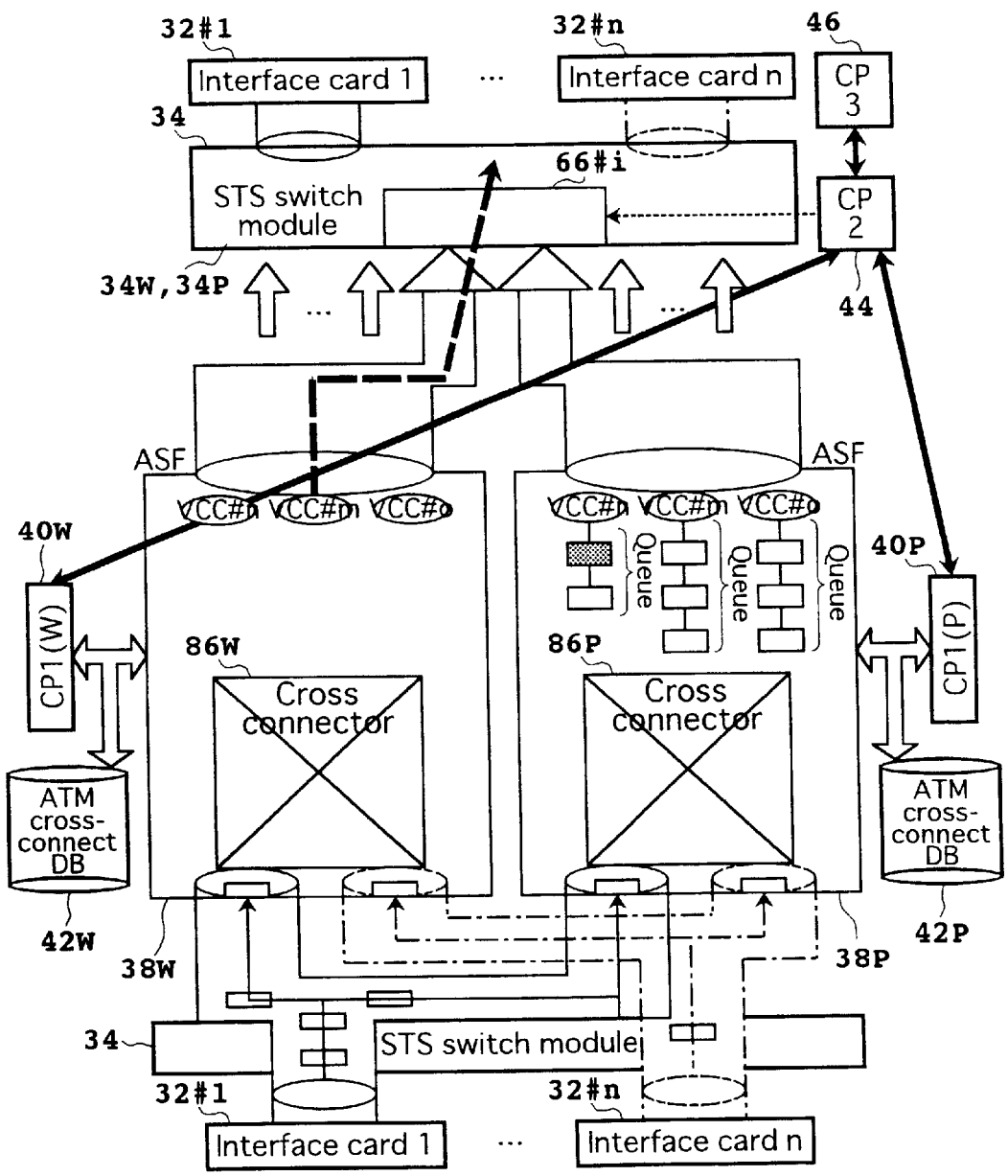
FIG. 14 shows a state of manual switching.

FIG. 14 shows a state in a manual switch mode. After the CP1 40W confirms reception of the answer OAM cell with regard to each of the all physical lines preset for routing, the queue empty detector 104 of the active ASF 38W counts the number of remaining queues (number of writes minus number of reads) performed by the buffer controller 94 to the buffers 88vcc#1–88vcc#m1, and then informs the active CP1 40W when the number of remaining queues in the all buffers 88vcc#1–88vcc#m1 becomes zero. Subsequently the active CP1 40W informs the CP2 44 that none of the queued cells is existent, and the operation is shifted to a manual switch mode as shown in FIG. 14.

(12) Manual switch completion mode

Figure 15:
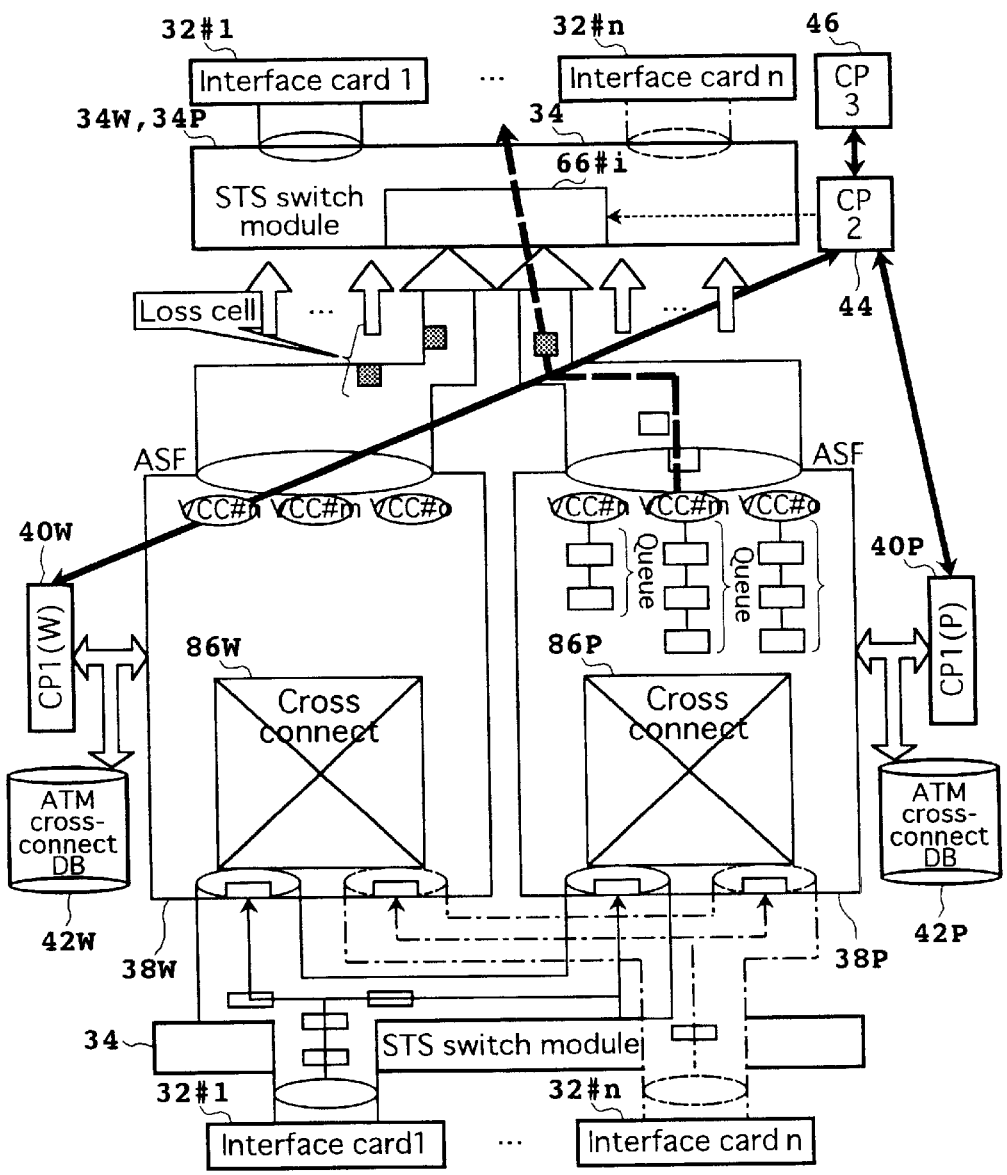
FIG. 15 shows a state after completion of the manual switching.

FIG. 15 shows a state in a manual switch completion mode. Upon shift to a manual switch mode, the CP2 44 instructs the CP1 40W and CP1 40P to execute active/standby switch. In the CP1 40W, the active processor is switched to the standby one, while in the CP1 40P, with regard to the physical line to be newly used after being set for ATM routing, the cell queuing controller 116#i corresponding to the relevant physical line is instructed to output the ATM cell from the tristate buffer 84#i, and the standby processor is switched to the active one. Further the CP2 44 outputs a select signal for switching inputs to the APS SEL 66#i (where i=1–m) of the STS switch modules 34W, 34P. As shown in FIG. 15, the STS-1 signal obtained from the former standby ASF 38P is selected by the STS switch modules 34W, 34P and then is outputted from the interface card 32#i (where i=1–n), whereby the operation is shifted to a manual switch completion mode.

In this case, out of the all ATM cells queued in the former active ASF 38W, loss cells discarded without being received by the STS switch modules 34W, 34P are only those not received by the STS switch module 34W before being switched by the APS SEL 66#i of the STS switch modules 34W, 34P, and thus it becomes possible to minimize the loss cells. However, the CP2 44 outputs a select signal for switching subsequently for a lapse of the time required for the STS-1 signal to arrive at the STS switch module 34W from the ASF 38W after the CP1 40W informs that none of queued cells is existent, thereby eliminating the loss cell.

(13) The CP3 46 copies the program and the database from the standby program area 120#2 and the standby database area 124#2 respectively into the active program area 136P and the active database area 138P of the CP1 40P that has been shifted from active to standby. In the CP3 46, it is not supposed that active/standby switch is completed.

(14) The CP3 46 in the transmitter 20#1 notifies the file server 22 on the switching result. The CP3 46 in each of the transmitters 20#2–20#4 notifies the file server 22 of the switching result via the overhead communication path, the main transmission line 21 and the CP3 46 in the transmitter 20#1. Then the file server 22 displays the switching result on an unshown display device or the like, thereby enabling the network manager to confirm the switching result. The following are exemplary cases that represent the results of such switching for upgrade in the transmitters 20#1–20#4.

(Case 1) Switching in the all transmitters 20#1–20#4 has been properly finished.

(Case 2) Switching in one transmitter 20#i has been improperly finished due to abnormal down-loading or the like of some program or database.

(Case 3) The switching result fails to be received by the file server 22 for the reason that, due to some communication trouble or apparatus fault, the switching result in one transmitter 20#i cannot be notified to the file server 22.

In any of the above cases, compatibility is generally secured between new and old versions of programs or databases, so that even if new and old programs or databases are coexistent in the transmitters 20#1–20#4 constituting a network, there arises no problem in running the network, therefore it seems to eliminate the necessity of the following processes. However, there may occur an occasion where management is complicated by the coexistence of new and old versions or, depending on the running situation, such coexistence of new and old versions is not permissible. In such a case, the transmitter 20#i shifted to the new version is returned to the old version by executing the following process. At step S6 in FIG. 11, the file server 22 checks if the all transmitters 20#1–20#4 have already notified proper finish or not. And if the result of this check is affirmative to signify notice of the proper finish, the operation proceeds to step S8 for instructing the CP3 46 to settle the new version. Meanwhile, if the result of the above check is negative, the operation proceeds to step S10.

At step S10, a check is executed as to whether the notices have already been received or not from the all transmitters 20#1–20#4. And in case the result of this check signifies that, although the notices were received from the all transmitters 20#1–20#4, one transmitter 20#i was not upgraded normally, then the operation proceeds to step S14 for using the other transmitter 20#j, which has already been shifted to the new version, as a fallback to the old version. Meanwhile, if the result of the above check is negative, the operation proceeds to step S12. Subsequently at step S12, another check is executed as to whether a predetermined time has elapsed or not from the reserved time. And if the result of this check is negative to signify no elapse of the predetermined time, the operation returns to step S6. Meanwhile, if the result of the above check is affirmative to signify an elapse of the predetermined time, it is judged to be derived from a fault in some communication line or apparatus relative to the transmitter 20#i whose notice has failed to arrive at the file server 22, so that the operation proceeds to step S16 for using the all transmitters 20#1–20#4 as self fallbacks to the old version.

Figure 16:
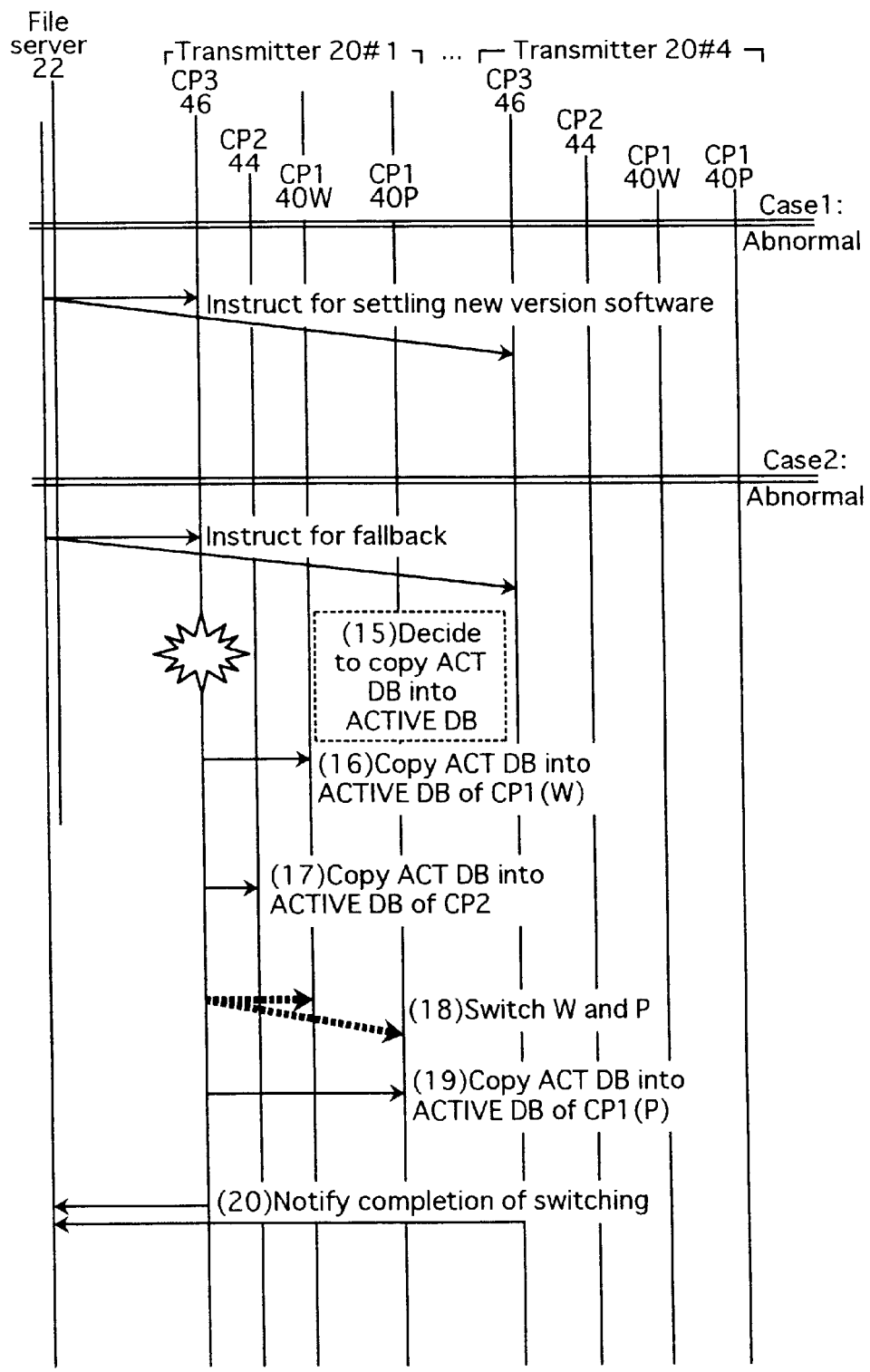
FIG. 16 is a sequence chart of settle instruction and fallback.

FIG. 16 is a sequence chart showing instructions for settlement and fallback.

(a) In Case 1:

At step S8, since normal results have been obtained from the all transmitters 20#1–20#4, the file server 22 instructs the all transmitters 20#1–20#4 to settle the new-version programs and databases. Then the CP3 46 in each of the transmitters 20#1–20#4 sets the new-version programs and databases in the CP2 44 and the CP1 40w as active programs and active databases while setting the old programs and databases of the preceding generation as standby programs and standby databases respectively.

(b) In Case 2:

At step S14, as one transmitter 20#i has been finished abnormally, the file server 22 instructs the transmitter 20#j, which has been switched to the new version, to fall back to the old version.

(15) The CP3 46 judges to copy the active program and database into the CP1 38P and CP2 44.

(16) The CP3 46 copies the program and database of the active program area 120#1 and active database area 124#1 for the CP1 40P into the active program area 136P and active database area 138P of the CP1 40P, respectively.

(17) The CP3 46 copies the program and database of the active program area 120#1 and active database area 124#1 for the CP2 44 into the active program area 132 and active database area 133 of the CP2 44, respectively.

(18) The active/standby switching is executed in the same manner as in (8)–(12) mentioned above.

(19) Copying is executed in the same manner as in (13).

(20) Similarly to the above, the CP3 46 notifies the file server 22 on completion of the switching.

Figure 17:
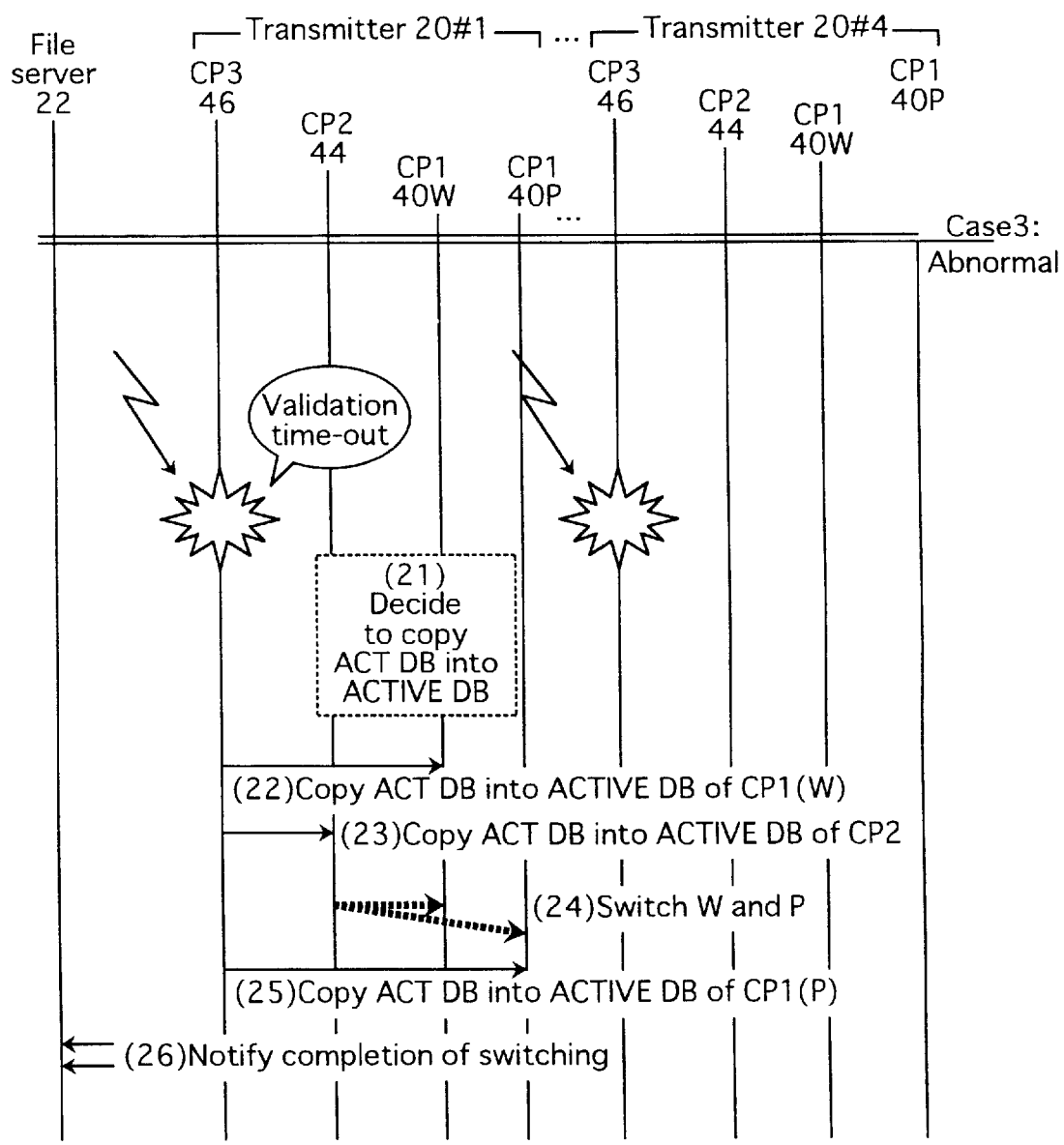
FIG. 17 is a sequence chart of self-fallback.

(c) In Case 3:

FIG. 17 is a sequence chart of self-fallback. At step S16, the transmitters 20#1–20#n receive no instruction for fallback or settlement from the file server 22 even after a lapse of the predetermined time, so that it is regarded as validation time-out, and the aforementioned self-fallback in (15)–(20) is executed also in (21)–(26) of FIG. 17. According to the present invention, as described hereinabove, there can be provided an improved cell switch module where the ATM cell band is freely changeable. And at the active/standby switching time for up-grading the network, the loss of the cells switched in the active cell switch module can be minimized. Further at the active/standby switching time for up-grading the network, it is possible to avoid a trouble that the same cells are switched and stored in duplication in the active and standby modules. In addition, up-grade of the network can be performed from a file server in a remote site to consequently simplify the up-grading operation with another advantage of reducing the communication cost.

What is claimed is:

1. A cell switch module having a unit cell switching function, comprising:

a plurality of input ports for inputting cells thereto respectively;

a plurality of output ports for outputting cells therefrom respectively; and cell switching control means placeable in either an active state or a standby state and executing control in such a manner that, in response to an active/standby switching instruction, a decision is made as to whether each cell obtained from the relevant input port is a specific first cell or not, and if the cell is said first cell in the active state, any subsequent cell obtained thereafter from the input port is not switched, but if the cell is said first cell in the standby state, any subsequent cell inputted thereafter is switched.

2. A cell switch module having a unit cell switching function, comprising:

a buffer memory for storing the switched cells;

a plurality of input ports for inputting cells thereto respectively;

a plurality of output ports for outputting cells therefrom respectively;

cell cross-connect means for routing the cells received from the input ports, then writing the cells successively in the relevant buffer memory;

cell switching control means placeable in either an active state or a standby state, and controlling the switching in such a manner that, in response to an active/standby switching instruction, a decision is made as to whether each cell obtained from the relevant input port is a specific first cell or not, and if the cell is said first cell in the active state, any subsequent cell obtained thereafter from the input port is not switched by said cell cross-connect means, but if the cell is said first cell in the standby state, any subsequent cell inputted thereafter is switched by said cell cross-connect means;

cell reading control means placeable in either the active state or the standby state, and serving, in the active state, to successively read the cells written in said buffer memory; and queue empty detection means placeable in either the active state or the standby state, and serving, in the active state, to detect whether the all cells written in said buffer memory have been completely read out therefrom.

3. The cell switch module according to claim 2, further comprising:

specific cell generation means for generating an answer-request specific second cell per output port; and multiplex means placeable in either the active state or the standby state, and serving, in the active state, to multiplex into a predetermined format the cell read out from said buffer memory corresponding to the relevant output port and said second cell generated for the output port, and sending the multiplexed cells to the output port.

4. The cell switch module according to claim 3, further comprising a plurality of tristate buffers provided between the input ports and the cross-connect means, wherein, in response to detection of said first cell, said cell switching control means shifts state of said tristate buffer provided between the first-cell received input port and the cross-connect means.

5. The cell switch module according to claim 3, wherein, if an answer cell replying to said second cell fails to be received within a fixed time, said specific cell generation means sends said second cell again.

\* \* \* \* \*